(12) United States Patent
Yan et al.

(10) Patent No.: US 12,539,975 B2
(45) Date of Patent: Feb. 3, 2026

(54) AERIAL VEHICLE AND CONTROL METHOD AND APPARATUS THEREFOR, AND STORAGE MEDIUM

(71) Applicant: SZ DJI TECHNOLOGY CO., LTD., Guangdong (CN)

(72) Inventors: Xiaokun Yan, Guangdong (CN); Zihao Zhang, Guangdong (CN); Chen Chen, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 105 days.

(21) Appl. No.: 18/430,678

(22) Filed: Feb. 2, 2024

(65) Prior Publication Data

US 2024/0199219 A1    Jun. 20, 2024

Related U.S. Application Data

(63) Continuation of application No. PCT/CN2021/115135, filed on Aug. 27, 2021.

(51) Int. Cl.
*B64D 31/06* (2006.01)
*B64C 27/26* (2006.01)
(Continued)

(52) U.S. Cl.
CPC ............. *B64D 31/06* (2013.01); *B64C 27/26* (2013.01); *G05D 1/49* (2024.01); *G05D 2109/254* (2024.01)

(58) Field of Classification Search
CPC ..... B64D 31/06; B64C 27/26; B64C 29/0025; G05D 1/49; G05D 2109/254; G05D 1/854;
(Continued)

(56) References Cited

U.S. PATENT DOCUMENTS 9,120,560 B1   9/2015   Armer et al.
9,242,738 B2   1/2016   Kroo
(Continued)

FOREIGN PATENT DOCUMENTS

CN    107264794 A    10/2017
CN    108945394 A    12/2018
(Continued)

OTHER PUBLICATIONS

International Search Report and Written Opinion mailed on May 6, 2022, received for PCT Application PCT/CN2021/115135, filed on Aug. 27, 2020, 8 pages including English Translation.

*Primary Examiner* — Thomas Ingram
(74) *Attorney, Agent, or Firm* — ANOVA LAW GROUP, PLLC

(57) ABSTRACT

A controller for an aerial vehicle, the aerial vehicle comprising a fuselage, fixed wings, and a multi-rotor assembly, the fixed wings disposed on both sides of the fuselage, and the multi-rotor assembly comprising at least two rotors disposed on either the fuselage or the fixed wings. The controller may comprise at least one memory storing at least one instruction set configured to control the vehicle, and at least one processor, communicatively coupled to the at least one memory. When the aerial vehicle operates, the at least one processor executes the at least one instruction set to, during cruise of the aerial vehicle, control at least a portion of the rotors of the multi-rotor assembly to actively rotate to provide a force in a vertical direction so that the multi-rotor assembly and the fixed wings together provide lift for the aerial vehicle.

17 Claims, 5 Drawing Sheets controlling all rotors of the multi-rotor assembly to rotate during cruise of the aerial vehicle so that the multi-rotor assembly and the fixed wing together provide lift to the aerial vehicle — S110 controlling rotational speeds of a plurality of rotors in the multi-rotor assembly to adjust an attitude of the aerial vehicle during the cruise of the aerial vehicle — S120 adjusting the rotational speeds of at least one of normal rotors to control the attitude of the vehicle when at least one of the rotors of the multi-rotor assembly fails during the cruise of the aerial vehicle, wherein a moment modulus of a composite lift force generated by all the normal rotors acting on the fuselage is greater than zero — S130

(51) Int. Cl.
*G05D 1/49* (2024.01)
*G05D 109/25* (2024.01)

(58) Field of Classification Search
CPC . G05D 2109/24; B64U 2201/10; B64U 10/20
See application file for complete search history.

(56) References Cited

U.S. PATENT DOCUMENTS

| | | | |
|---|---|---|---|
| 11,964,753 B2* | 4/2024 | Merdinger | B64C 27/20 |
| 2016/0107751 A1* | 4/2016 | D'Andrea | B64C 27/32 |
| | | | 701/4 |
| 2018/0105268 A1* | 4/2018 | Tighe | B64U 10/10 |
| 2018/0105279 A1* | 4/2018 | Tighe | B64D 29/02 |
| 2019/0127056 A1* | 5/2019 | Weekes | B64C 39/12 |
| 2019/0291860 A1* | 9/2019 | Morgan | B64C 21/00 |
| 2020/0247536 A1* | 8/2020 | Mokhtarian | B64C 11/46 |
| 2021/0107640 A1 | 4/2021 | Baity et al. | |
| 2024/0034466 A1* | 2/2024 | Ishitsuka | B64C 29/0025 |

FOREIGN PATENT DOCUMENTS

| | | |
|---|---|---|
| CN | 111026146 A | 4/2020 |
| CN | 111094126 A | 5/2020 |
| EP | 2616333 B1 | 11/2016 |

* cited by examiner

```
┌──────────────────────────────────────────────────────────────────────────┐
│ controlling all rotors of the multi-rotor assembly to rotate during cruise of the aerial │
│ vehicle so that the multi-rotor assembly and the fixed wing together provide lift to the │──S110
│                              aerial vehicle                              │
└──────────────────────────────────────────────────────────────────────────┘
                                    ↓
┌──────────────────────────────────────────────────────────────────────────┐
│ controlling rotational speeds of a plurality of rotors in the multi-rotor assembly to adjust an │──S120
│          attitude of the aerial vehicle during the cruise of the aerial vehicle          │
└──────────────────────────────────────────────────────────────────────────┘
                                    ↓
┌──────────────────────────────────────────────────────────────────────────┐
│ adjusting the rotational speeds of at least one of normal rotors to control the attitude of the │
│ vehicle when at least one of the rotors of the multi-rotor assembly fails during the cruise of │──S130
│ the aerial vehicle, wherein a moment modulus of a composite lift force generated by all the │
│              normal rotors acting on the fuselage is greater than zero              │
└──────────────────────────────────────────────────────────────────────────┘
```

Fig.1

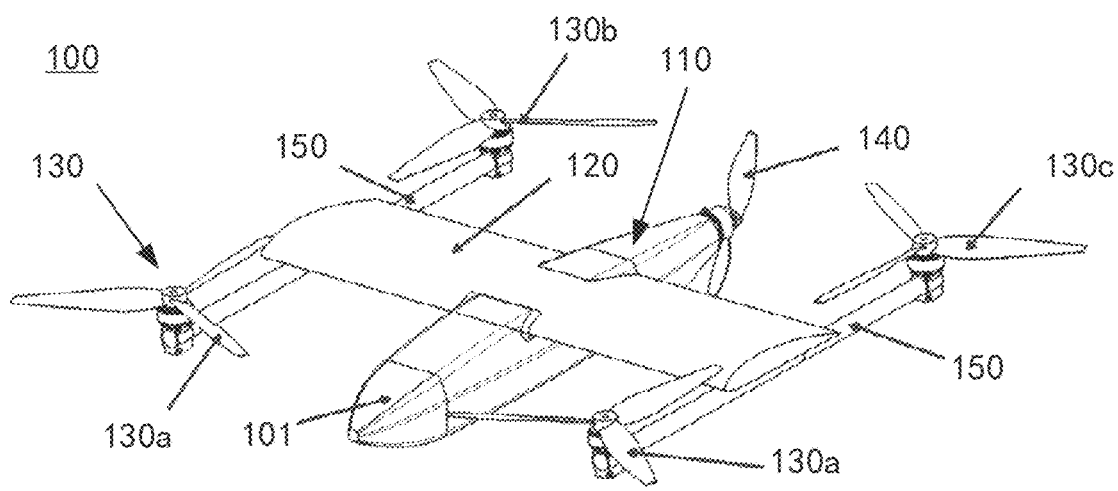

Fig.2

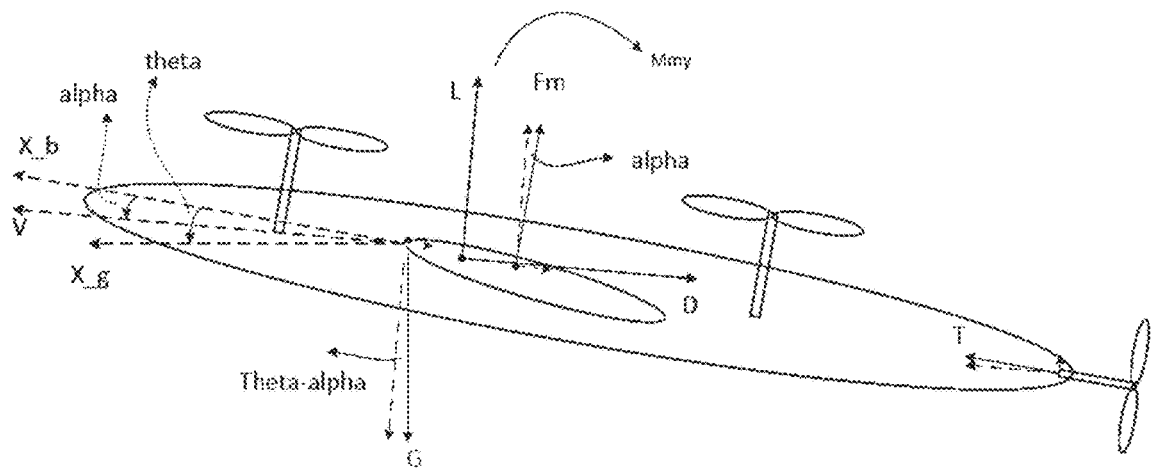

Fig.5

| |
|---|
| controlling all rotor rotations of the multi-rotor assembly so that the multi-rotor assembly and the fixed wing together provide lift to the vehicle during the cruise of the vehicle — S210 |
| controlling the rotational speed of a plurality of rotors in the multi-rotor assembly to adjust the attitude of the vehicle during the cruise of the vehicle — S220 |
| during the cruise of the vehicle, when a deceleration command is received, controlling the operating state of the horizontal thruster to change so as to create drag on the horizontal propulsion assembly — S230 |

Fig.6 controlling all rotor of the multi-rotor assembly to rotate so that the multi-rotor assembly and the fixed wing together provide lift to the aerial vehicle during the cruise of the aerial vehicle ~S310 controlling rotational speeds of a plurality of rotors in the multi-rotor assembly to adjust an attitude of the aerial vehicle during the cruise of the aerial vehicle ~S320 during the cruise of the aerial vehicle, simultaneously controlling a pitch attitude of the aerial vehicle, a rotation speed of the horizontal propulsion assembly, and the lift generated by the rotor assembly in accordance with received commands to change the flight state of the aerial vehicle ~S330

Fig.7

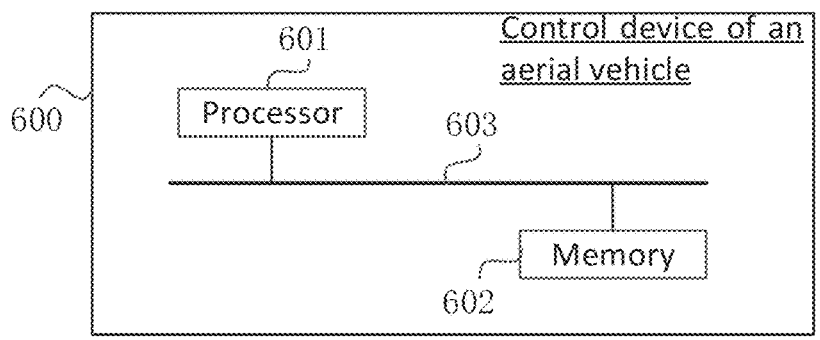

Fig.8

AERIAL VEHICLE AND CONTROL METHOD AND APPARATUS THEREFOR, AND STORAGE MEDIUM

CROSS-REFERENCE TO RELATED APPLICATION

The present application is a continuation of International Application No. PCT/CN2021/115135, filed Aug. 27, 2021, which is incorporated herein by reference in its entirety.

TECHNICAL FIELD

The present disclosure relates to the technical field of aerial vehicles, and in particular, to an aerial vehicle and a control method, a control device, and a storage medium thereof.

BACKGROUND

With the development and advancement of aerial vehicle technology, Vertical Take-Off and Landing (VTOL) aerial vehicle are sought after in the market because of their combination of vertical take-off and landing capability and high-speed level flight capability.

The VTOL vehicle is usually retrofitted with a rotor device, which solves the problem of take-off and landing sites. When the aerial vehicle is stalled, a rotor mode can be switched to protect it. When cruising, the aerial vehicle is flown in a fixed-wing mode. When aerial vehicle is in the fixed-wing mode, the rotor is stalled. At this time, there is no lift generated by the rotor, and the rotor only generates a waste drag, which makes the flight less efficient.

SUMMARY

One embodiment of the present disclosure is a controller for an aerial vehicle, the aerial vehicle comprising a fuselage, fixed wings, and a multi-rotor assembly, the fixed wings disposed on either side of the fuselage, and the multi-rotor assembly comprising at least two rotors disposed on either the fuselage or the fixed wings; the controller may comprise at least one memory storing at least one instruction set configured to control the aerial vehicle, and at least one processor, communicatively coupled to the at least one memory. When the aerial vehicle operates, the at least one processor executes the at least one instruction set to during cruise of the aerial vehicle, control at least a portion of the rotors of the multi-rotor assembly to actively rotate to provide a force in a vertical direction so that the multi-rotor assembly and the fixed wing together provide lift for the aerial vehicle.

Another embodiment of the present disclosure is an aerial vehicle comprising: a fuselage; fixed wings, the fixed wings being located on both sides of the fuselage; a multi-rotor assembly comprising at least two rotors, the rotors being disposed on the fuselage or the fixed wings; at least one memory storing at least one instruction set configured to control the aerial vehicle; and at least one processor, communicatively coupled to the at least one memory. When the aerial vehicle operates, the at least one processor executes the at least one instruction set to: during cruise of the aerial vehicle, control at least a portion of the rotors of the multi-rotor assembly to actively rotate to provide a force in a vertical direction so that the multi-rotor assembly and the fixed wings together provide lift for the aerial vehicle.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

FIG. 1 is a flow diagram of a control method of an aerial vehicle provided by an embodiment of the present disclosure;

FIG. 2 is a schematic diagram of a structure of an aerial vehicle in an embodiment of the present disclosure;

FIG. 5 is a schematic diagram of force analysis of an aerial vehicle while cruising;

FIG. 6 is a flow diagram of a control method of an aerial vehicle provided in an embodiment of the present disclosure;

FIG. 7 is a flow diagram of a control method of an aerial vehicle provided by yet another embodiment of the present disclosure;

FIG. 8 is a schematic block diagram of a control device for an aerial vehicle provided by an embodiment of the present disclosure;

DETAILED DESCRIPTION

Figure 3:
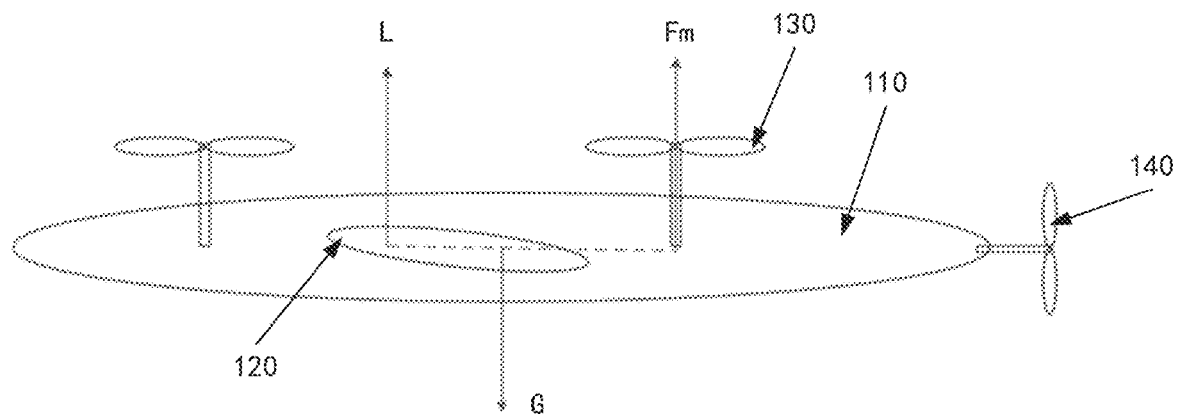
FIG. 3 is a schematic diagram of a structure of an aerial vehicle in another embodiment of the present disclosure.

The technical solutions in the embodiments of the present disclosure will be described clearly and completely in the following in conjunction with the accompanying drawings in the embodiments of the present disclosure, and it is obvious that the described embodiments are a part of the embodiments of the present disclosure and not all of the embodiments. Based on the embodiments in this disclosure, all other embodiments obtained by a person of ordinary skill in the art without making creative effort fall within the scope of protection of this disclosure.

The flowchart shown in the accompanying drawings is only an example illustration and is not necessary to include all contents and operations/steps, nor is it necessary to perform them in the order depicted. For example, some of the operations/steps may also be decomposed, combined or partially merged, and thus the actual order of execution may change depending on the actual situation.

Some embodiments of the present disclosure are described in detail below in conjunction with the accompanying drawings. The following embodiments and features in the embodiments may be combined with each other without conflict.

Certain existing vehicle application scenarios require long range vehicles, such as long range UAVs to participate, and currently, long range UAVs are mostly fixed-wing and VTOL vehicles, which are used in the fields of surveying and mapping as well as petroleum inspection. Although fixed-wing UAVs have superior range under the same takeoff weight, they cannot hover at the designated location. At the same time, in the process of flight, due to the mechanism of generating lift, when the flight speed is lower than the stalling speed, fixed-wing UAVs will stall, which will make the fixed-wing UAVs enter a dangerous and uncontrollable flight state, with a certain probability of leading to the explosion of the aerial vehicle. Moreover, fixed-wing UAVs have certain requirements for the takeoff and landing sites. The VTOL vehicle is equipped with a rotor device, which solves the problem of take-off and landing sites, and when stalling, it can switch to a rotor mode for protection; the control of fixed-wing flight is completed by a main wing and a rudder of the tail wing, and a rudder actuating system on the wing reduces the reliability of the whole aerial vehicle, and the area of the wing surface is too large, and the current VTOL vehicle stowage size has a large gap compared with a rotorcraft. In addition, the VTOL vehicle structure coefficient is relatively large, which reduces the flight performance under the rotor model, and there is a big gap between the endurance and wind resistance performance comparing to a quadrotor; and VTOL vehicle has an obvious transition state between rotor and fixed-wing mode switching. Due to the large area of the airfoil of the VTOL vehicle, the wing loading is lower and the spread length is larger, so it is subjected to more wind interference, the hovering wind resistance is poor, and the transition wind resistance is poor. In the transition state, in the case of abnormal sensors such as the airspeed tube, sudden wind disturbances, etc., the VTOL vehicle has the risk of having too low a speed, too large an angle of approach, resulting in the main wing stalling and crashing; In the fixed-wing mode flight, rotor rotation is stalled. At this time, the rotor does not generate lift, and only generates waste resistance, and is also unable to adapt to low-speed and high-efficiency flight.

The inventors of the present disclosure have improved the method of controlling an aerial vehicle comprising a fixed-wing and a multi-rotor in order to solve at least one of the above technical problems of existing VTOL vehicles.

Referring to FIG. 1, FIG. 1 is a flow diagram of a control method for an aerial vehicle provided by embodiments of the present disclosure. The control method for an aerial vehicle may be applied in an aerial vehicle or a control device of the aerial vehicle, such as a flight controller, for controlling processes such as the flight attitude of the aerial vehicle. Further, the aerial vehicle may be an unmanned aerial vehicle or may also be a manned aerial vehicle.

In some implementations, the aerial vehicle may fly autonomously or may fly based on commands sent from the terminal device, such as speed change commands, attitude change commands, or altitude change commands. Exemplarily, the terminal device includes at least one of the following: a cell phone, a tablet, a laptop, a desktop computer, a personal digital assistant, a wearable device, or a remote control.

As shown in FIG. 2, the aerial vehicle 100 includes a fuselage 110, a fixed wing 120, a multi-rotor assembly 130, and a horizontal propulsion assembly 140. The fixed wing 120 is disposed on both sides of the fuselage 110. The multi-rotor assembly 130 is mounted to either the fuselage 110 or the fixed wing 120. The horizontal propulsion assembly 140 is disposed at the head 101 or tail of fuselage 110 for providing horizontal thrust for cruise of the aerial vehicle 100. Exemplarily, a bracket 150 is symmetrically attached to both sides of the fixed wing 120, and the multi-rotor assembly 130 is attached to the bracket 150.

The brackets 150 on each side of the fixed wing 120 are disposed on each side of the fuselage 110. The brackets 150 on each side of the fixed wing 120 are spaced apart. Optionally, in the illustrated embodiment, the brackets 150 on each side of the fixed wing 120 are disposed parallel to each other. Each bracket 150 is provided with at least one rotor. Optionally, in the illustrated embodiment, one rotor is provided at each end of each bracket 150.

The fixed wing 120 is provided parallel to the pitch axis of the aerial vehicle 100. In order to improve both maneuverability and cruising performance of the aerial vehicle 100, the length of the fixed wing 120 is greater than the minimum distance between projections of the propeller blades of the rotors on both sides of the fixed wing 120 on the pitch axis of the aerial vehicle 100, and is smaller than the maximum distance between projections of the propeller blades of the rotors on both sides of the fixed wing 120 on the pitch axis of the aerial vehicle 100. Optionally, in one embodiment, the length of the fixed wing 120 is substantially equal to the distance between the projections of the rotation axes of the rotors on both sides of the fixed wing 120 on the pitch axis of the aerial vehicle 100.

Optionally, the number of fixed wings 120 may be one or more, or the fixed wings 120 may be integrally provided with the fuselage 110, for example, by adopting a wing-body combination configuration. Optionally in the illustrated embodiment, the fixed wing 120 is one, the middle of which is fixedly connected to the fuselage 110, and the fixed wing 120 is provided with a bracket 150 at each end.

Optionally, the multi-rotor assembly 130 includes a plurality of rotors, or a plurality of culvert fans, which may be in the form of, for example, a 6-axis or co-axial twin propeller, and the number of blades of the rotors may be two blades, three blades, four blades, without limiting the number of blades.

Optionally, the horizontal propulsion assembly 140 includes one or more propellers, or includes one or more culvert fans. In some implementations, a yaw moment modulus can be generated by controlling the horizontal propulsion assembly 140 to adjust the yaw attitude of the aerial vehicle.

In some embodiments, the working conditions of the aerial vehicle may include takeoff, cruise, landing, or may also include hovering. Exemplarily, the multi-rotor assembly may be controlled to generate lift such that the aerial vehicle takes off under the lift provided by the multi-rotor assembly; the aerial vehicle takes off and then cruises by controlling the horizontal propulsion assembly to generate tension or thrust such that the aerial vehicle generates speed in the horizontal direction. When the aerial vehicle hovers, the multi-rotor assembly is controlled to generate lift to offset the gravity of the aerial vehicle, and when the aerial vehicle lands, the lift of the multi-rotor assembly is less than the gravity of the aerial vehicle.

As shown in FIG. 1, the method of controlling an aerial vehicle of an embodiment of the present disclosure comprises steps S110 to steps S130.

S110, controlling all rotor rotations of a multi-rotor assembly during cruise of the aerial vehicle so that the multi-rotor assembly and the fixed wing together provide lift to the aerial vehicle.

Exemplarily, the multi-rotor assembly can also be controlled to rotate during the aerial vehicle cruise to generate thrust in the horizontal direction, and it will be appreciated that the horizontal thrust required for the aerial vehicle cruise can be provided by the horizontal propulsion assembly alone or by the horizontal propulsion assembly in conjunction with the multi-rotor assembly for more efficient flight, higher maneuverability in the horizontal direction, and faster acceleration.

In the process of cruising the aerial vehicle, the flow rate of the airflow over the upper and lower surfaces of the fixed wing is different, so that the fixed wing provides lift for the aerial vehicle. At the same time, the rotor blades of the multi-rotor assembly do not stop, so that by controlling the rotation of all the rotor blades of the multi-rotor assembly, the lift can be provided to the aerial vehicle, so as to maintain the aerial vehicle with sufficient lift, so that in time, when the speed of the aerial vehicle in the process of cruising is relatively low, the aerial vehicle still has sufficient lift, thereby preventing stall. In some embodiments, better hovering performance can be achieved.

Since the multi-rotor assembly and the fixed wing jointly provide lift during cruise, compared to a conventional rotorcraft where only the rotor wing provides lift, the fixed wing of the aerial vehicle of some embodiments of the present disclosure has a higher lift-to-drag ratio, and can provide higher lift with the same power requirement, and thus can have a higher range. In some embodiments, compared to a rotorcraft, the aerial vehicle of an embodiment of the present disclosure can double the range on the basis of the same weight and size class, halve the power requirement for high-speed flight, and smoothly change the power requirement for medium- and high-speed flight, so as to avoid the problem of the trend of sharp increase in power of a rotorcraft.

In some embodiments, on the basis that the rotor can normally provide control force, the airfoil of the fixed wing can increase the proportion of lift, thereby improving the lift-to-drag ratio of the aerial vehicle.

In some embodiments, the fixed wing provides some of the lift during cruise and the rotor speed can be reduced, which can increase the flight speed.

During cruise, the wing provides some of the lift, which reduces the rotor speed, reduces the tip Mach number, and increases the flight speed.

By controlling the multi-rotor assembly and the fixed wing to jointly provide lift for the aerial vehicle, the rotor blades do not stop rotating during cruise flight, which can improve flight efficiency of the aerial vehicle, and make the multi-rotor assembly more responsive, for example, performing emergency braking in avoiding an obstacle; the lift provided by the multi-rotor assembly and the fixed wing together can be larger, so that the aerial vehicle has a higher rate of climb. Accordingly, obstacle avoidance as well as emergency climb can be better maneuvered.

S120, controlling the rotational speed of a plurality of rotors in the multi-rotor assembly to adjust the attitude of the aerial vehicle during the cruise of the aerial vehicle.

By way of example, the rotational speeds of a plurality of rotors in the multi-rotor assembly may be controlled to adjust at least one of the following: a roll attitude, a pitch attitude, and a yaw attitude of the aerial vehicle. Exemplarily, the pitch attitude of the aerial vehicle can be adjusted by controlling a rotational speed difference between the rotational speeds of the front and rear rotors; the roll attitude of the aerial vehicle can be adjusted by controlling a rotational speed difference between the rotational speeds of the left and right rotors; or the yaw attitude of the aerial vehicle can be adjusted by controlling the rotational speeds of the rotors on the diagonal to create a torque difference. Adjusting the attitude of the aerial vehicle by controlling the multi-rotor assembly may result in better maneuverability of the aerial vehicle.

Flight control forces may be provided by rotor blades during the cruise of the aerial vehicle. In some embodiments, there may be no tail components on the aerial vehicle and/or no rudder surfaces or outer wing segments on the fixed wing, with simple mechanics and high reliability. Illustratively, eliminating the rudder is equivalent to reducing the unreliability of the control system of the aerial vehicle and reducing the investment in maintaining the control system, i.e., a rudderless design can improve the reliability of the aerial vehicle; and a rudderless outer wing segment or tailless design can result in the aerial vehicle having superior wind resistance when hovering. Moreover, the aerial vehicle can have a smaller stowage size and a lighter weight, and the stowage time and size of the whole vehicle assembly can be greatly reduced.

In some embodiments, a rudder surface is provided on the fixed wing, and the rudder surface can be controlled to act as a flap, increasing the wing lift during low-speed flight and reducing low-speed flight power consumption; The rudder surface and the multi-rotor assembly can also be controlled to increase the control moment modulus of the aerial vehicle during high-speed flight, such as at least one of the moment modulus, the pitch moment modulus or the yaw moment modulus. Alternatively, when the rotor in the multi-rotor assembly fails, the control surface is controlled to adjust the roll attitude, the pitch attitude, or the yaw attitude of the aerial vehicle.

In some embodiments, on the basis that the rotor can normally provide control force, the airfoil of the fixed wing can increase the proportion of lift, thereby improving the lift-to-drag ratio of the aerial vehicle.

S130, adjusting the rotational speed of at least one normal rotor to control the attitude of the aerial vehicle when at least one rotor of the multi-rotor assembly fails during cruise of the aerial vehicle; wherein a moment modulus of a composite lift force generated by all the normal rotors acting on the fuselage is greater than zero.

Exemplarily, that the moment modulus of the composite lift generated by all the normal rotors acting on the fuselage is greater than zero comprises at least one of: the moment modulus of the composite lift generated by all the normal rotors relative to the pitch axis of the fuselage is greater than zero; the moment modulus of the composite lift generated by all the normal rotors relative to the yaw axis of the fuselage is greater than zero; and the moment modulus of the composite lift generated by all the normal rotors relative to the roll axis of the fuselage is greater than zero. It can be understood that by adjusting the rotation speed of at least one normal rotor located on both sides of the fuselage, when the moment modulus of the composite lift generated by all the normal rotors relative to the pitch axis of the fuselage is greater than zero, the pitch attitude of the aerial vehicle can be controlled; when the moment modulus of the composite lift generated by all the normal rotors relative to the yaw axis of the fuselage is greater than zero, the yaw attitude of the aerial vehicle can be controlled; and when the moment modulus of the composite lift generated by all the normal rotors relative to the roll axis of the fuselage is greater than zero, the roll attitude of the aerial vehicle can be controlled.

Exemplarily, the composite lift generated by all the normal rotors and the lift generated by the fixed wings are disposed on opposite sides of the center of gravity of the aerial vehicle to adjust the attitude of the aerial vehicle and to enable the aerial vehicle to fly smoothly. Exemplarily, the multi-rotor assembly includes a plurality of rotors disposed on either side of the fixed wing. When one of the rotors malfunctions, all rotors located on one side of the fixed wing with the malfunctioning rotor are controlled to cease operation and all rotors located on the other side of the fixed wing are controlled to operate normally to adjust the attitude of the aerial vehicle and enable the aerial vehicle to fly smoothly. In another embodiment, all the rotors located on the other side of the fixed wing are symmetrically distributed on both sides of the fuselage of the aerial vehicle.

Referring to FIG. 2, when one or more of the rotors 130a of the multi-rotor assembly fails, the rotational speeds of the first rotor 130b and the second rotor 130c disposed on both sides of the fuselage are adjusted to control the attitude of the aerial vehicle, such as one or more of a roll attitude, a pitch attitude, or a yaw attitude. Without limitation, of course, the rotational speeds of the plurality of rotors of co-axial twin-propellers on the fuselage can be adjusted, for example, to control the attitude of the aerial vehicle.

In some embodiments, when at least one rotor of the multi-rotor assembly fails, the rotational speeds of the first rotor and the second rotor disposed symmetrically on either side of the fuselage are adjusted to control the roll attitude, the pitch attitude, or the yaw attitude of the aerial vehicle.

Exemplarily, taking the multi-rotor assembly comprising four rotors as an example, when all four rotors are normal, the roll attitude, the pitch attitude and the yaw attitude of the aerial vehicle can be controlled by adjusting the rotational speeds of the four rotors; when one of the two rotors set on both sides of the head of the aerial vehicle fails or both of them fail, the rotational speeds of the two rotors set on both sides of the tail of the aerial can be adjusted in order to control the roll attitude, the pitch attitude, or the yaw attitude of the aerial vehicle; when one of the two rotors provided on both sides of the tail of the aerial vehicle fails or both of them fail, the rotational speeds of the two rotors provided on both sides of the head of the aerial vehicle can be adjusted to control the roll attitude, the pitch attitude, or the yaw attitude of the aerial vehicle.

Referring to FIGS. 2 and 3, in the event of a failure of a rotor close to the head of the fuselage 110, i.e., away from the horizontal propulsion assembly 140, the rotational speeds of the rotors proximate to the horizontal propulsion assembly 140 and disposed on either side of the fuselage can be adjusted to control the roll attitude, the pitch attitude, or the yaw attitude of the aerial vehicle.

In some implementations, as shown in FIG. 2, the fixed wing 140 is disposed substantially in the middle of the fuselage 110, which can improve the attitude stability of the aerial vehicle.

As shown in FIG. 3, G denotes the gravitational force of the aerial vehicle, L denotes the lift of the fixed wing, and Fm denotes the composite lift of the first rotor and the second rotor. It will be appreciated that by controlling the rotational speeds of the first rotor and the second rotor, it is possible to keep the attitude of the aerial vehicle unchanged under the force of gravity G, the force of lift L, and the composite lift Fm, or to adjust the roll attitude, the pitch attitude, and the yaw attitude of the aerial vehicle under the force of gravity G, the force of lift L, and the composite lift Fm.

In some embodiments, one of the rotors or the plurality of rotors in the multi-rotor assembly 130 has a rotor mounting angle that is greater than or equal to 5 degrees and less than or equal to 25 degrees to improve flight efficiency. The rotor mounting angle is an angle between a chord line of the blades in one or more of the rotors and the horizontal plane.

Exemplarily, by rationally designing the aerodynamic focal point and the position of the center of gravity of the aerial vehicle, for example, by designing the mounting position of the rotor blades such that the center of gravity of the aerial vehicle is located between the point of action of the lift L of the fixed wing and the point of action of the composite lift Fm of the first rotor and the second rotor, it is possible to rely on only a portion of the rotor blades for the control of the attitude of the aerial vehicle during the cruise of the aerial vehicle.

In some embodiments, the adjusting the rotational speed of at least one normal rotor to control the attitude of the aerial vehicle comprises: adjusting the rotational speed of a first rotor and a second rotor disposed on either side of the fuselage, and controlling the rotational speed of the horizontal propulsion assembly to control the aerial vehicle to remain stable.

Exemplarily, referring to FIG. 3, the center of gravity of the aerial vehicle is located between the point of action of the lift L of the fixed wing and the point of action of the composite lift Fm of the first rotor and the second rotor.

In some embodiments, the adjusting the rotational speed of at least one normal rotor to control the attitude of the aerial vehicle comprises: simultaneously adjusting the rotational speeds of a first rotor and a second rotor disposed on both sides of the fuselage to control the pitch attitude of the aerial vehicle.

Exemplarily, referring to FIG. 3, the aerial vehicle adjusts its pitch attitude under the action of the moment modulus of the fixed wing's lift force L when the difference between the moment modulus of the lift force L of the fixed wing and the moment modulus of the composite lift force Fm of the first rotor wing and the second rotor wing acting on the center of gravity of the aerial vehicle is not zero. For example, when the moment modulus of the component of the lift force L in the direction of the longitudinal axis of the fuselage acting on the center of gravity of the aerial vehicle is larger than the moment modulus of the component of the composite lift force Fm in the direction of the longitudinal axis of the fuselage acting on the center of gravity of the aerial vehicle, the pitch angle of the aerial vehicle is increased, and the head is lifted up; when the moment modulus of the component of the lift force L in the direction of the longitudinal axis of the fuselage acting on the center of gravity of the aerial vehicle of a fixed wing is smaller than the moment modulus of the composite lift force Fm in the direction of the longitudinal axis of the fuselage, the pitch angle of the aerial vehicle decreases, and the head is lowered; when the moment modulus of the component of the lift force L in the direction of the longitudinal axis of the fuselage acting on the center of gravity of the aerial vehicle of a fixed wing is equal to the moment modulus of the composite lift force Fm in the direction of the longitudinal axis of the fuselage, the pitch angle of the aerial vehicle can be zero.

Exemplarily, in adjusting the rotational speeds of the first rotor and the second rotor disposed on both sides of the fuselage to control the roll attitude, the pitch attitude and the yaw attitude of the aerial vehicle, the rotational speeds of the first rotor and the second rotor can be simultaneously increased or decreased, for example, controlling the rotational speed of the first rotor and the rotational speed of the second rotor to be equal, which can reduce the degree of coupling between the roll attitude and the yaw attitude of the aerial vehicle, thereby improving safety.

In some embodiments, the adjusting the rotational speed of at least one normal rotor to control the attitude of the aerial vehicle comprises: adjusting the rotational speeds of the first rotor and the second rotor disposed on both sides of the fuselage provided with a rotational speed difference occurring in order to control the roll attitude and the yaw attitude of the aerial vehicle.

Exemplarily, when a rotational speed difference occurs between the rotational speeds of the first rotor and the second rotor, the moment moduli of the lift of the first rotor and the lift of the second rotor acting on the aerial vehicle are not equal, and the difference in the moment moduli of the lift of the first rotor and the lift of the second rotor acting on the aerial vehicle can cause the attitude of the aerial vehicle to be changed, and optionally can adjust the roll attitude and the yaw attitude of the aerial vehicle. For example, when the rotational speed of the left rotor is greater than the rotational speed of the right rotor, the aerial vehicle rolls to the right and yaws; when the rotational speed of the left rotor is less than the rotational speed of the right rotor, the aerial vehicle rolls to the left and yaws; when the rotational speed of the left rotor is equal to the rotational speed of the right rotor, the aerial vehicle's roll angle may be zero and the yaw angle may be maintained constant.

By adjusting the rotational speed of at least one of the normal rotors to control the attitude of the aerial vehicle, it is possible to maintain normal flight of the aerial vehicle even in the event of a failure of a portion of the rotors of the multi-rotor assembly, which improves the safety of the aerial vehicle and prevents the aerial vehicle from going out of control and crashing in the event of a failure of the rotors.

In some embodiments, the control method further comprises: controlling a change in the operating state of the horizontal thruster to cause a drag force on the horizontal propulsion assembly when a deceleration command is received during the cruise of the aerial vehicle. Exemplarily, the drag is a resistance during forward flight of the UAV.

Exemplarily, controlling a change in the operating state of the horizontal thruster comprises at least one of the following: a change in the rotational speed of the horizontal thruster, a change in the direction of rotation of the horizontal thruster, or a change in an attitude of the horizontal thruster.

By way of example, when a deceleration command is received during the cruise of the aerial vehicle, the rotational speed and/or direction of rotation of the horizontal thrusters is controlled so as to create drag on the horizontal propulsion assembly.

By way of example, during the cruise of the aerial vehicle, when a deceleration command is received, the attitude of the horizontal thruster is changed, for example by tilting the blades of the horizontal thruster, so as to cause the blades of the horizontal thruster to form an obstruction to the airflow and to create a drag force.

Exemplarily, the deceleration command may be sent by the terminal device in accordance with a user operation, or it may also be generated by the aerial vehicle, such as a deceleration command generated when determining the need for obstacle avoidance, but of course is not limited to this.

Exemplarily, the rotational speed of the horizontal thruster may be controlled to decrease such that the horizontal propulsion assembly creates drag. Exemplarily, the rotational speed of the horizontal thruster is controlled to be reduced such that the horizontal thruster provides less pull or thrust than the wind resistance of the horizontal thruster, such that the horizontal propulsion assembly creates drag that slows down the aerial vehicle.

Optionally, when a deceleration command is received during the cruise of the aerial vehicle, the rotational speed of the horizontal thruster may be controlled based on the current airspeed of the aerial vehicle so as to cause a drag on the horizontal propulsion assembly. For example, a current wind resistance of the horizontal thruster is determined based on the current airspeed of the aerial vehicle, and the rotational speed of the horizontal thruster is controlled to be reduced based on the current wind resistance of the horizontal thruster such that the horizontal thruster provides less pull or thrust than the current wind resistance of the horizontal thruster.

Exemplarily, the horizontal thruster may be controlled to rotate in reverse to cause the horizontal propulsion assembly to generate drag. For example, controlling the horizontal thruster at the tail of the airframe to rotate in reverse causes the horizontal thruster to create a backward pull and the aerial vehicle to decelerate, i.e., as the aerial vehicle decelerates, the tail thrust motor is controlled to go into a reverse thrust state to provide negative thrust to accelerate the deceleration.

Exemplarily, the controlling a change in the operating state of the horizontal thruster to create drag to the horizontal propulsion assembly comprises: stopping the supply of power to the horizontal propulsion assembly to cause the horizontal thruster to rotate under airflow.

Upon ceasing to supply power to the horizontal propulsion assembly, the blades of the horizontal propulsion assembly may rotate themselves in the direction of the airflow, having a drag effect on the wind, thereby creating drag. Optionally, electrical braking can be applied to the horizontal propulsion assembly, such as reverse braking, energy braking, capacitive braking, and feed-back braking, to increase the drag force to quickly respond to the deceleration command.

In some embodiments, during the cruise of the aerial vehicle, when a deceleration command is received, a change in the operating state of the horizontal thruster is controlled to cause the horizontal propulsion assembly to generate drag; and when the deceleration is complete, a change in the operating state of the horizontal thruster is controlled to provide horizontal thrust for the cruise of the aerial vehicle. It will be appreciated that the horizontal thruster can be used both to generate drag when decelerating and to provide horizontal thrust for cruising to keep the aerial vehicle at a constant speed or to accelerate it, resulting in better maneuverability of the aerial vehicle.

By controlling a change in the operating state of the horizontal thruster during the cruise of the aerial vehicle to create drag to the horizontal propulsion assembly, it can respond more quickly to deceleration commands, improve obstacle avoidance performance, and have better safety.

In some embodiments, the controlling method further comprises: simultaneously controlling the pitch attitude of the aerial vehicle and the rotation speed of the horizontal propulsion assembly to accelerate or decelerate based on the received speed change command during the cruise of the aerial vehicle, and returning the pitch attitude of the aerial vehicle to a state of horizontal cruise after the acceleration is completed or the deceleration is completed.

During acceleration of the aerial vehicle, in addition to controlling the rotation speed of the horizontal propulsion assembly, the efficiency of acceleration or deceleration is improved by simultaneously controlling the pitch attitude of the aerial vehicle to utilize the component of thrust of the multi-rotor assembly in the horizontal direction. Exemplarily, when the aerial vehicle is accelerating, the pitch angle of the aerial vehicle is simultaneously controlled to decrease, the head is depressed, and the thrust of the multi-rotor assembly pushes the aerial vehicle to accelerate in the horizontal direction; and when the aerial vehicle is decelerating, the pitch angle of the aerial vehicle is simultaneously controlled to increase, the head is elevated, and the thrust of the multi-rotor assembly pulls the aerial vehicle to decelerate in the horizontal direction. After the acceleration is completed or the deceleration is completed, the pitch attitude of the aerial vehicle is made to return to the state of horizontal cruising, and the thrust of the multi-rotor assembly is in the opposite direction of gravity, and the aerial vehicle can enter into a constant speed and smooth flight. Wherein the pitch angle is used to indicate the angle between the fuselage axis (along the nose direction) and the ground plane (horizontal plane), wherein the pitch angle is zero when the aerial vehicle is cruising horizontally, negative when the aerial vehicle is head down, and positive when the aerial vehicle is head up.

In some embodiments, the controlling method further comprises: during the cruise of the aerial vehicle, simultaneously controlling the pitch attitude of the aerial vehicle and the rotation speed of the horizontal propulsion assembly to accelerate or decelerate in accordance with the received speed change command and altitude change command, to improve the efficiency of the acceleration or deceleration; and, after the acceleration or deceleration is completed, causing the pitch attitude of the aerial vehicle to change in response to the altitude change command, and when the altitude adjustment is completed, returning the pitch attitude of the aerial vehicle to a state of horizontal cruise. By controlling the pitch attitude of the aerial vehicle when the aerial vehicle is accelerating or decelerating, the acceleration and deceleration can be made more rapid and the maneuverability can be better; and after the acceleration and deceleration and the altitude adjustment are completed, the pitch attitude of the aerial vehicle is caused to return to the state of horizontal cruising. As such, it can be convenient for the aerial vehicle to fly smoothly.

Exemplarily, after the acceleration is completed or the deceleration is completed, the pitch attitude of the aerial vehicle may continue to be adjusted in response to an altitude change command, for example, by controlling the rotational speeds of a plurality of rotors of the multi-rotor assembly to adjust the pitch attitude of the aerial vehicle, or when at least one rotor of the multi-rotor assembly malfunctions, by adjusting the rotational speeds of the first rotor and the second rotor disposed on both sides of the fuselage, to control the pitch attitude of the pitch attitude of the aerial vehicle to raise or lower the aerial altitude of the aerial vehicle during cruise. When the altitude adjustment is completed, the pitch attitude of the aerial vehicle is returned to the horizontal cruise state, and the aerial vehicle can enter into constant speed and smooth flight.

In some embodiments, the control method further comprises: simultaneously controlling a pitch attitude of the aerial vehicle, a rotation speed of the horizontal propulsion assembly, and a lift generated by the rotor assembly, in accordance with received commands to change the flight state of the aerial vehicle during the cruise of the aerial vehicle.

Exemplarily, the changing the flight state of the aerial vehicle comprises at least one of the following: changing the speed of the aerial vehicle, changing the altitude of the aerial vehicle, and changing the attitude of the aerial vehicle. Wherein the commands for changing the speed of the aerial vehicle may be referred to as speed change commands, the commands for changing the altitude of the aerial vehicle may be referred to as altitude change commands, and the commands for changing the attitude of the aerial vehicle may be referred to as attitude change commands. It is to be understood that the commands received at the same moment for changing the flight state of the aerial vehicle may include one of a speed change command, an altitude change command, an attitude change command, or may also include a plurality of them.

Optionally, the speed at which the aerial vehicle cruises can be adjusted by controlling the rotation speed of the horizontal propulsion assembly, which can make the aerial vehicle accelerate or decelerate faster; the change in the speed of the aerial vehicle causes a change in the lift of the fixed wing, and the lift of the fixed wing and the lift generated by the rotor assembly cause a change in the altitude of the aerial vehicle, which can make the aerial vehicle ascend or descend faster; in the case where the pitch angle of the aerial vehicle is not zero, and under predetermined other parameters, the aerial vehicle can be made to ascend or descend more quickly by controlling the pitch attitude of the aerial vehicle; when the pitch angle of the aerial vehicle is not zero, the efficiency of accelerating or decelerating at cruising speed can be improved by utilizing the component of the thrust of the multi-rotor assembly in the horizontal direction. By simultaneously controlling the pitch attitude of the aerial vehicle, the rotation speed of the horizontal propulsion assembly, and the lift generated by the rotor assembly, the aerial vehicle can be made to respond to commands more quickly, for example, when the aerial vehicle is accelerating or decelerating, the aerial vehicle can be made to accelerate or decelerate more quickly by simultaneously controlling the pitch attitude of the aerial vehicle; or when the aerial vehicle is ascending or descending, by simultaneously controlling the pitch attitude can cause the aerial vehicle to ascend or descend more quickly, which can improve the maneuverability of the aerial vehicle.

Exemplarily, when simultaneously controlling the pitch attitude of the aerial vehicle and the rotation speed of the horizontal propulsion assembly, the pitch angle of the aerial vehicle is negatively correlated with the acceleration of the aerial vehicle. By way of example, the pitch angle of the aerial vehicle is negatively correlated with the acceleration corresponding to the speed change command.

Exemplarily, when the acceleration corresponding to the speed change command is negative, i.e., when the aerial vehicle is instructed to decelerate, the pitch angle of the aerial vehicle is controlled to be positive, i.e., the pitch angle of the aerial vehicle is controlled to increase and the head is raised, which allows for faster deceleration; when the acceleration corresponding to the speed change command is positive, i.e., when the aerial vehicle is instructed to accelerate, the pitch angle of the aerial vehicle is controlled to be negative, i.e., the pitch angle of the aerial vehicle is controlled to be decreased and the head is depressed to allow faster acceleration.

Exemplarily, when the commands to change the altitude of the aerial vehicle are the same and the commands to change the attitude of the aerial vehicle are the same, the pitch angle of the aerial vehicle when accelerating is less than the pitch angle of the aerial vehicle when decelerating.

Exemplarily, when the altitude change command directs the aerial vehicle to ascend and the speed change command directs the aerial vehicle to decelerate, the pitch angle of the control vehicle is increased, and the aerial vehicle can ascend faster and decelerate faster; and when the altitude change command directs the aerial vehicle to descend and the speed change command directs the aerial vehicle to accelerate, the pitch angle of the control vehicle is decreased, and the aerial vehicle can descend faster and accelerate faster.

Exemplarily, the commands for the flight state of the aerial vehicle include an altitude command and a speed command, both of which are adjusted in three modes, (1) both at the same time; (2) adjusting the speed in priority and the altitude later; and (3) adjusting the altitude in priority and the speed later.

When both are adjusted simultaneously, the altitude of the aerial vehicle and the speed of the aerial vehicle converge to the target altitude and target speed indicated by the command during the control process. Exemplarily, when the aerial vehicle receives an acceleration and an ascent command, the aerial vehicle adjusts the pitch angle to be negative for acceleration and the aerial vehicle simultaneously carries out an ascent movement; when the aerial vehicle receives a deceleration and a descent command, the aerial vehicle adjusts the pitch angle to be positive for deceleration and the aerial vehicle simultaneously carries out a descent movement.

When the speed is adjusted first and the altitude is adjusted later, the speed of the aerial vehicle converges to the target speed indicated by the command first, and the altitude of the aerial vehicle converges to the target altitude indicated by the command only later. Exemplarily, when the aerial vehicle receives an acceleration and an ascent command, the aerial vehicle first adjusts the pitch angle to be negative for acceleration, and the altitude of the aerial vehicle remains unchanged, and when the aerial vehicle completes the speed adjustment, the pitch angle is adjusted to be positive for the ascent movement; when the aerial vehicle receives a deceleration and a descent command, the aerial vehicle adjusts the pitch angle to be positive for deceleration, and the altitude of the aerial vehicle remains unchanged, and when the aerial vehicle completes the speed adjustment, the pitch angle is adjusted to be negative for the descent movement. When the aerial vehicle finishes the speed adjustment, the pitch angle is adjusted to negative for descending motion.

When the altitude is adjusted first and the speed is adjusted later, the altitude of the aerial vehicle converges to the target speed indicated by the command first, and the speed of the aerial vehicle converges to the target altitude indicated by the command only later. Exemplarily, when the aerial vehicle receives an acceleration and an ascent command, the aerial vehicle first adjusts the pitch angle to be positive for ascent, and the speed of the aerial vehicle remains unchanged, and when the aerial vehicle completes the altitude adjustment, the pitch angle is adjusted to be negative for acceleration; when the aerial vehicle receives a deceleration and a descent command, the aerial vehicle adjusts the pitch angle to be negative for descent, and the speed of the aerial vehicle remains unchanged, and when the aerial vehicle completes the altitude adjustment, the pitch angle is adjusted to be positive for deceleration. When the aerial vehicle finishes the altitude adjustment, the pitch angle is adjusted to positive for deceleration.

Exemplarily, when the speed is adjusted in priority and the altitude is adjusted later, when controlling according to the received command to change the flight state of the aerial vehicle, if the received command instructs the aerial vehicle to accelerate and change the altitude or to maintain the altitude unchanged, the altitude of the aerial vehicle after the acceleration is completed is lower than the altitude indicated by the received command (the altitude after the change or the maintained altitude). If the received command directs the aerial vehicle to decelerate and change altitude or maintain altitude unchanged, the altitude of the aerial vehicle after completion of deceleration is higher than the altitude indicated by the command (changed altitude or maintained altitude). Exemplarily, when speed is adjusted preferentially and altitude is adjusted later, when the speed change command instructs the aerial vehicle to accelerate, the rotation speed of the horizontal propulsion assembly is simultaneously controlled to accelerate and the pitch angle of the aerial vehicle is reduced to accelerate as quickly as possible; the pitch angle of the aerial vehicle is reduced during acceleration, i.e., the aerial vehicle responds preferentially to the speed change command, and upon completion of acceleration, the altitude of the aerial vehicle is lower than the altitude indicated by the altitude change command altitude; after the acceleration is completed, the altitude of the aerial vehicle may continue to be adjusted in accordance with the altitude change command. When the speed change command instructs the aerial vehicle to decelerate, simultaneously controlling the rotation speed of the horizontal propulsion assembly to decelerate and the pitch angle of the aerial vehicle to increase in order to decelerate as quickly as possible; during the deceleration process, the pitch angle of the aerial vehicle increases, and upon completion of the deceleration, the altitude of the aerial vehicle is higher than the altitude indicated by the altitude change command; after completion of the deceleration, the height of the aerial vehicle may continue to be adjusted according to the altitude change command.

By way of example, when adjusting altitude and speed simultaneously, by simultaneously controlling the pitch attitude of the aerial vehicle, the rate of rotation of the horizontal propulsion assembly, and the lift generated by the rotor assembly, such that when the speed of the aerial vehicle reaches the speed indicated by the speed change command, the altitude of the aerial vehicle also reaches the altitude indicated by the altitude change command at the same time.

Exemplarily, when both altitude and speed are adjusted, the pitch angle of the aerial vehicle is adjusted based on the altitude command and the speed command. Different combinations of altitude commands and speed commands indicate different target pitch angles, including being positive, negative, or horizontal.

In some embodiments, the controlling method further comprises: after the received command changes the flight state of the aerial vehicle, causing the pitch attitude of the aerial vehicle to return to a state of horizontal cruising. By controlling the pitch attitude of the aerial vehicle when the aerial vehicle is accelerating or decelerating, acceleration and deceleration can be made more rapid and maneuverability can be better; after acceleration and deceleration and altitude adjustment are completed, causing the pitch attitude of the aerial vehicle to return to the state of horizontal cruising, thereby facilitating smooth flight of the aerial vehicle.

In some embodiments, the controlling the pitch attitude of the aerial vehicle, the rotation speed of the horizontal propulsion assembly, based on received commands to change the flight state of the aerial vehicle, comprises: determining a first target pitch angle based on received speed change command and altitude change command; determining a pitch compensation amount based on the speed change command; determining a second target pitch angle based on the sum of the first target pitch angle and the pitch compensation amount; and controlling the pitch angle of the aerial vehicle to converge to the second target pitch angle based on the second target pitch angle. By determining the pitch compensation amount according to the speed change command and adjusting the pitch attitude of the aerial vehicle when accelerating or decelerating according to the pitch compensation amount, the acceleration or deceleration can be accelerated and the maneuverability of the aerial vehicle can be improved.

Optionally, the pitch compensation amount is negatively correlated with the acceleration corresponding to the speed change command. Exemplarily, the pitch compensation amount is negative when the speed change command instructs the aerial vehicle to accelerate, and the pitch compensation amount is positive when the speed change command instructs the aerial vehicle to decelerate. It will be appreciated that when the aerial vehicle is accelerating, the pitch angle of the control vehicle is decreased, the head is depressed, and the thrust of the multi-rotor assembly pushes the aerial vehicle to accelerate horizontally; and when the aerial vehicle is decelerating, the pitch angle of the control vehicle is increased, the head is elevated, and the thrust of the multi-rotor assembly pulls the aerial vehicle to decelerate horizontally.

Exemplarily, the determining a first target pitch angle based on the received speed change command and altitude change command comprises: determining the first target pitch angle based on the received speed change command, altitude change command and a preset correspondence between first target pitch angles and speed change command sand altitude change commands. By way of example, the correspondence between the predetermined first target pitch angles and the speed change commands and the altitude change commands is stored in a database, and the first target pitch angles can be queried in the database based on the received speed change commands and the altitude change commands.

Exemplarily, the determining a first target pitch angle based on the received speed change command and altitude change command comprises: determining a first target pitch angle based on the received speed change command and altitude change command and based on a predetermined optimization model.

In some implementations, the control parameters such as the target pitch angle determined based on the predetermined optimization model can ensure that the aerial vehicle flies stably within the full flight envelope with good control quality. For example, the aerial vehicle has a plurality of stable cruise states, for example, due to the horizontal propulsion component involved in the control, the flight angle of the aerial vehicle at a stable speed can be from a plurality of flight angles, the power of the aerial vehicle is inconsistent across different cruise states, the control parameters such as the target pitch angle determined by the preset optimization model can enable the aerial vehicle to be at the optimal cruise power for flight.

In some implementations, the predetermined state quantities of the optimization model include a speed change command, an altitude change command, a first target pitch angle, a rotor lift, and a horizontal thrust. It will be appreciated that the first target pitch angle, the rotor lift and the horizontal thrust can control the altitude and the speed of the aerial vehicle, and the optimization model can determine the optimal first target pitch angle, the rotor lift and the horizontal thrust corresponding to the speed change command and the altitude change command.

Exemplarily, based on the mathematical derivation, the expressions of the corresponding pitch angle, rotor lift and horizontal thrust can be determined based on the speed change command and the altitude change command. Based on the expressions of the pitch angle, the rotor lift and the horizontal thrust and the first target pitch angle, the rotor lift and the horizontal thrust in the state quantities of the optimization model, a value of an objective function can be determined, and through the optimization solving, the optimized state quantities, i.e., the better first target pitch angle, rotor lift and horizontal thrust corresponding to the speed change command and altitude change command, can be obtained.

Exemplarily, the objective function of the optimization model includes at least one of the following: power demand, response time, actuator output change, and actuator power. By way of example, based on the power model function of the aerial vehicle, the power demand corresponding to the speed change command and the altitude change command is determined, and by introducing the factor of the power demand in solving for the better first target pitch angle, rotor lift and horizontal thrust, the determined control parameters enable the aerial vehicle to fly at the optimal cruise power. By way of example, the power model function can be obtained by measuring, in wind tunnel experiments, the power values of the rotor motors and the motors of the horizontal propulsion assembly according to different flight heading angles at different rotational speeds.

Exemplarily, the constraints of the optimization model include at least one of the following: a flight heading angle constraint, a flight state constraint, and a movement amplitude constraint. It is possible to make the control parameters such as the target pitch angle determined based on the predetermined optimization model to have a higher safety performance.

In some embodiments, the simultaneously controlling the pitch attitude of the aerial vehicle, the rotation speed of the horizontal propulsion assembly, and the lift generated by the rotor assembly, based on received commands to change the flight state of the aerial vehicle, comprises: adjusting the rotational speed of the rotor blades in the multi-rotor assembly based on the rotor lift determined by the received speed change commands and the altitude change commands; and/ or adjusting the rotational speed of the rotor blades in the multi-rotor assembly based on the horizontal thrust determined by the received speed change commands and the altitude change commands, so that the aerial vehicle adjusts its flight speed in accordance with the speed change commands, and its flight altitude in accordance with the altitude change commands.

Exemplarily, the rotor lift and the horizontal thrust may be determined based on a preset correspondence between rotor lifts and horizontal thrusts and the speed change commands and the altitude change commands as well as the received speed change command and the altitude change command. By way of example, the correspondence between the predetermined first target pitch angles, rotor lifts, and horizontal thrusts and the speed change commands and the altitude change commands is stored in a database, and the first target pitch angles, rotor lifts, and horizontal thrusts can be queried in the database based on the received speed change commands and the altitude change commands.

Exemplarily, the rotor lift and the horizontal thrust may be determined based on a predetermined optimization model based on received speed change command and altitude change command. In some implementations, the state quantities of the predetermined optimization model include a speed change command, an altitude change command, a first target pitch angle, a rotor lift, and a horizontal thrust. Exemplarily, the objective function of the optimization model includes at least one of the following: power demand, response time, actuator output change, and actuator power. Exemplarily, the constraints of the optimization model include at least one of the following: flight heading angle constraint, flight state constraint, and movement magnitude constraint.

Figure 4:
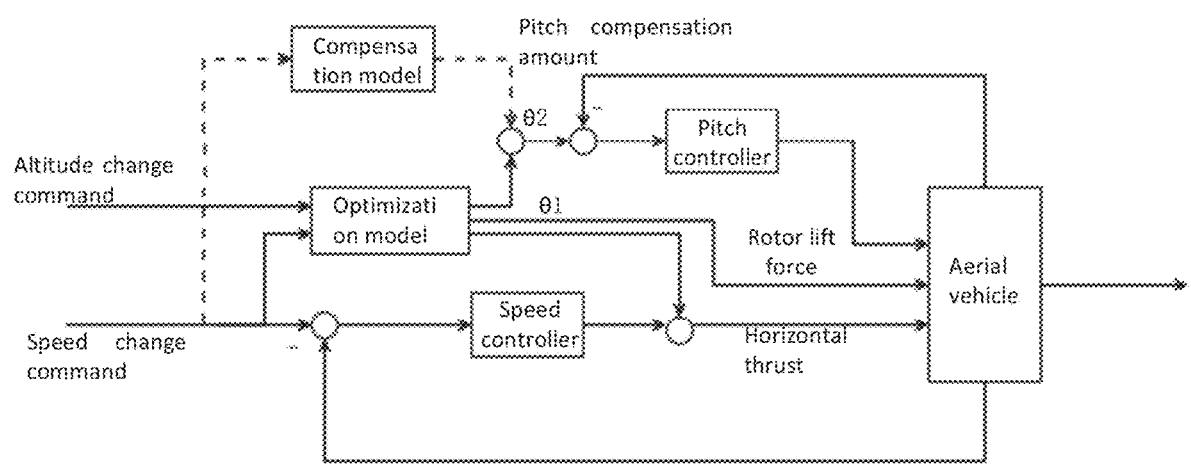
FIG. 4 is a schematic diagram of a control system for an aerial vehicle in an embodiment of the present disclosure.

In some embodiments, as shown in FIG. 4, a first target pitch angle θ1, rotor lift, and horizontal thrust are determined based on the received speed change command and altitude change command and based on a predetermined optimization model, and a pitch compensation amount is determined based on the speed change command, and a second target pitch angle θ2 is determined based on the sum of the first target pitch angle θ1 and the pitch compensation amount; for example the pitch compensation amount may be determined based on the speed change command and based on a compensation model, the compensation model being used to indicate that the pitch compensation amount is negatively correlated with an acceleration corresponding to the speed change command.

Exemplarily, the pitch-based controller can control the pitch angle of the aerial vehicle towards the second target pitch angle, for example by means of a PID (Proportional Integral Derivative) controller. During the cruising process of the aerial vehicle, the rotational speeds of multiple rotors in the multi-rotor assembly may be controlled to adjust the pitch attitude of the aerial vehicle, or during the cruising process of the aerial vehicle, when at least one of the multi-rotor components in the multi-rotor assembly fails, the rotational speeds of the first rotor and the second rotor located on both sides of the fuselage are adjusted to control the pitch attitude of the aerial vehicle.

For example, the horizontal thrust may be determined based on the speed controller and the speed change command, for example, the rotational speed and/or rotation direction of the horizontal thruster may be controlled based on the horizontal thrust output by the speed controller and/or the horizontal thrust output by the optimization model. For example, the rotation speed of the multi-rotor assembly is controlled according to the rotor lift output from the optimization model.

In some embodiments, a schematic diagram of the forces on the aerial vehicle while cruising is shown in FIG. 5, where L denotes the lift generated by the fixed wing, D denotes the drag generated by the fixed wing, Fm denotes the lift generated by the multi-rotor assembly, T denotes the thrust generated by the horizontal propulsion assembly, and G denotes the gravity of the aerial vehicle; X_g denotes the transverse axis of the geoaxial system, X_b denotes the longitudinal axis of the body-axial system, V denotes the airspeed of the aerial vehicle, alpha (α) denotes the angle of approach of the fixed wing, theta (θ) denotes the aerial vehicle's pitch angle, and Mmy denotes the pitch moment modulus.

The set of equations for the longitudinal dynamics of the aerial vehicle can be expressed as follows:

$\Sigma F_x = -D + T \cos \alpha - F_m \sin \alpha - mg \sin(\theta - \alpha) = m\dot{V}$ $\Sigma F_z = -L - F_m \cos \alpha - T \sin \alpha + mg \cos(\theta - \alpha) = mV\dot{\mu} = mV(q - \dot{\alpha})$ Where q denotes the pitch angle rate, μ denotes the trajectory tilt angle, m denotes the mass of the aerial vehicle, $\Sigma F_x$ denotes the sum of the forces on the aerial vehicle in the horizontal direction, $\Sigma F_z$ denotes the sum of the forces on the aerial vehicle in the longitudinal direction, $\dot{V}$ denotes the acceleration at airspeed, $\dot{\mu}$ denotes the trajectory tilt angle speed, and $\dot{\alpha}$ denotes the pitch angle speed.

The longitudinal dynamics of the aerial vehicle is an underdetermined set of equations with multiple steady states, for each of which the power and flight efficiency of the aerial vehicle are different.

Exemplarily, as the airspeed V increases, the lift L increases, and in order to maintain the altitude unchanged, it is necessary to adjust the aerial vehicle's angle of approach α or to reduce the rotor thrust Fm. However, when the rotor lift Fm is reduced, it will result in the rotor motor rotating at too low speed, or even power saturation, and will not be able to provide sufficient pitch moment modulus, and roll moment modulus, to maintain the stability of the aerial vehicle's attitude.

Please refer to FIG. 4, the optimization model can determine the control force Fx that needs to act on the aerial vehicle in the horizontal direction and the control force Fz in the longitudinal direction (vertical direction) according to the altitude change command and each speed change command, and according to the control force Fx and the control force Fz, determine the corresponding first target pitch angle θ1, rotor lift and horizontal thrust; Due to the existence of the above-mentioned underdetermined equations, after the control force is given, there will be multiple values for the first target pitch angle θ1, rotor lift and horizontal thrust. Different values will have different flight powers when they act on the aerial vehicle. In order to maximize the range of the aerial vehicle, the most reasonable first target pitch angle θ1, rotor lift and horizontal thrust can be solved through the following optimization problems:

The optimization problem state quantities include a trajectory tilt angle μ, a speed change command V, a first target pitch angle θ, a rotor lift $F_m$, and a horizontal thrust T, wherein the trajectory tilt angle μ can be determined based on the speed change command V and the altitude change command, and the state quantities can be expressed as:

$x = [\mu \; V \; \theta \; F_m \; T]$

The objective function of the optimization problem can be expressed as:

$$J = P^2(x) + K_1 \left( F_x^{cmd} - F_x(x) \right)^2 + K_2 \left( F_z^{cmd} - F_z(x) \right)^2$$

The purpose of this objective function is to allow the aerial vehicle to provide the first target pitch angle, rotor lift and horizontal thrust needed for the speed change command and altitude change command with minimum energy requirement. Among them, P(x)=power(x), is the power model function of the aerial vehicle, and the power model of the whole aerial vehicle can be approximated by measuring the power values of the rotor motor and tail-thrust motor under different flight angles and different rotational speeds in wind tunnel experiments; $F_x(x)$ and $F_z(x)$ are the functions for calculating the synergistic external forces in the horizontal and vertical directions of the aerial vehicle, respectively, which are expressed as follows:

$F_x(x) = -D + T \cos \alpha - F_m \sin \alpha - mg \sin(\theta - \alpha)$ $F_z(z) = -L - F_m \cos \alpha - T \sin \alpha + mg \cos(\theta - \alpha)$ $F_x^{cmd}, F_z^{cmd}$ represent control forces that need to be applied to the aerial vehicle in the horizontal direction and in the longitudinal direction (vertical direction), respectively; $K_1$ and $K_2$ are the weights, which are used to regulate the weights of the errors of the horizontal and vertical external forces in the optimization problem, respectively.

In solving the above optimization problem, the following constraints also need to be satisfied so that the solved solution can conform to the real motion of the aerial vehicle, the constraints can be expressed by the following two equations:

$$\begin{cases} Ax \le \alpha_{max}, -Ax \le -\alpha_{min} & (1) \\ lb \le x \le ub & (2) \end{cases}$$

Equation (1) is to constrain the flight angle of the aerial vehicle by the lower pitch angle limit $\alpha_{min}$ and the upper pitch angle limit $\alpha_{max}$, A is the angle calculation matrix obtained from the equation $\alpha=\theta-\mu$; Equation (2) is to limit the states and outputs of the aerial vehicle, lb denotes the preset first state vector and ub denotes the preset second state vector.

By solving the above optimization problem, the required first target pitch angle, rotor lift and horizontal thrust can be obtained when the aerial vehicle obtains the control force that needs to act on the aerial vehicle in the horizontal direction and in the longitudinal direction (vertical direction) under any speed change command and altitude change command. Longitudinal control of the aerial vehicle is achieved by means of a control system as shown in FIG. 4. It is noted that in some implementations, it is also possible to determine the amount of pitch compensation based on the speed change command without based on the compensation model, as well as the amount of pitch compensation based on the amount of pitch compensation added to the first target pitch angle θ1, which can put the aerial vehicle in a more economical cruise state.

Exemplarily, as shown in FIG. 4, maneuverability of the aerial vehicle during acceleration and deceleration can be increased by determining the amount of pitch compensation based on the compensation model based on the speed change command and by adding a feed-forward channel from the speed change command to the pitch angle θ1 based on the amount of pitch compensation, i.e., by adding a feed-forward channel from the speed change command to the pitch angle. Referring to FIG. 4, the feedforward channel shown by the dashed line is a nonlinear incompletely differentiated link whose transfer function can be expressed as:

$$K(V_{cmd}, V_{cur}) \cdot \frac{s}{Ts+1}$$

Where $K(V_{cmd}, V_{cur})$ is a function related to the current airspeed of the aerial vehicle $V_{cur}$ and the speed change command $V_{cmd}$, which understandably increases the maneuverability of the aerial vehicle during acceleration and deceleration.

Some embodiments of the present disclosure provide a method of controlling an aerial vehicle, in which all rotors of a multi-rotor assembly are controlled to rotate during cruise of the aerial vehicle to cause the multi-rotor assembly and the fixed wing to jointly provide lift for the aerial vehicle; and in which the rotational speeds of a plurality of rotors of the multi-rotor assembly are controlled to adjust the attitude of the aerial vehicle during cruise of the aerial vehicle. When at least one of the rotors of the multi-rotor assembly malfunctions, adjusting the rotational speed of at least one of the normal rotors to control the attitude of the aerial vehicle; wherein the moment modulus of the composite lift force generated by all normal rotors acting on the fuselage is greater than zero, capable of improving the flight efficiency, maneuverability, and safety of the aerial vehicle having rotors and fixed wings.

Please refer to FIG. 6 in conjunction with the foregoing embodiment, which is a flow diagram of a control method of an aerial vehicle provided by some embodiments of the present disclosure. The control method for an aerial vehicle may be applied in an aerial vehicle or a control device of the aerial vehicle, such as a flight controller, for controlling processes such as the flight attitude of the aerial vehicle. Further, the aerial vehicle may be an unmanned aerial vehicle or may also be a manned aerial vehicle.

In some implementations, the aerial vehicle may fly autonomously or may fly based on commands sent from the terminal device, such as speed change commands, attitude change commands, altitude change commands. Exemplarily, the terminal device includes at least one of the following: a cell phone, a tablet, a laptop, a desktop computer, a personal digital assistant, a wearable device, a remote control.

As shown in FIG. 2, the aerial vehicle 100 includes a fuselage 110, a fixed wing 120, a multi-rotor assembly 130, and a horizontal propulsion assembly 140, with the fixed wing 120 disposed on both sides of the fuselage 110, the multi-rotor assembly 130 mounted to the fuselage 110 or the fixed wing 120, and the horizontal propulsion assembly 140 disposed on the head 101 or tail of the fuselage 110 to provide the aerial vehicle 100 with cruising of horizontal thrust. Exemplarily, a bracket 150 is symmetrically attached to both sides of the fixed wing 120, and the multi-rotor assembly 130 is attached to the bracket 150.

Optionally, the number of fixed wings 120 may be one or more, or the fixed wings 120 may be integrally disposed with the fuselage 110, such as in a wing-body combination configuration.

Optionally, the multi-rotor assembly 130 includes a plurality of rotors, or a plurality of culvert fans, which may be in the form of, for example, a 6-axis or co-axial twin propeller, and the number of blades of the rotors may be two blades, three blades, four blades, without limiting the number of paddle blades.

Optionally, the horizontal propulsion assembly 140 includes one or more thrusters, or includes one or more culvert fans. In some implementations, the horizontal propulsion assembly 140 can be controlled to generate a yaw moment module to adjust the yaw attitude of the aerial vehicle.

As shown in FIG. 6, the method of controlling an aerial vehicle of an embodiment of the present disclosure includes steps S210 to S230.

S210, controlling all rotor rotations of the multi-rotor assembly so that the multi-rotor assembly and the fixed wing together provide lift to the aerial vehicle during the cruise of the aerial vehicle;

S220, controlling the rotational speed of a plurality of rotors in the multi-rotor assembly to adjust the attitude of the aerial vehicle during the cruise of the aerial vehicle;

S230, during the cruise of the aerial vehicle, when a deceleration command is received, controlling the operating state of the horizontal thruster to change so as to create drag on the horizontal propulsion assembly.

Optionally, controlling a change in the operating state of the horizontal thruster comprises at least one of the following: changing the rotational speed of the horizontal thruster, changing the direction of rotation of the horizontal thruster, and change the attitude of the horizontal thruster.

Optionally, the controlling a change in the operating state of the horizontal thruster to create drag to the horizontal propulsion assembly comprises: controlling a decrease in the rotational speed of the horizontal thruster or controlling a reverse rotation of the horizontal thruster to create drag to the horizontal propulsion assembly.

Optionally, the controlling a change in the operating state of the horizontal thruster to create drag to the horizontal propulsion assembly comprises:

stopping the supply of power to the horizontal propulsion assembly to allow the horizontal thruster to rotate under airflow.

Optionally, the control method further comprises:
when deceleration is complete, the operating state of the horizontal thrusters is controlled to change to provide horizontal thrust for cruising of the aerial vehicle.

Optionally, the control method further comprises:
simultaneously controlling the pitch attitude of the aerial vehicle and the rotation speed of the horizontal propulsion assembly for acceleration or deceleration in accordance with the received speed change command during the cruise of the aerial vehicle, and returning the pitch attitude of the aerial vehicle to a state of horizontal cruise after the acceleration is completed or the deceleration is completed; or in the course of the aerial vehicle cruising, simultaneously controlling the pitch attitude of the aerial vehicle and the rotation speed of the horizontal propulsion assembly for acceleration or deceleration in accordance with the received speed change command and altitude change command, as well as, upon completion of the acceleration or deceleration, causing the pitch attitude of the aerial vehicle to change in response to the altitude change command, and, upon completion of the altitude adjustment, causing the pitch attitude of the aerial vehicle to return to a state of horizontal cruise.

Optionally, the control method further comprises:
during the cruise of the aerial vehicle, the pitch attitude of the aerial vehicle, the rate of rotation of the horizontal propulsion assembly, and the lift generated by the rotor assembly are simultaneously controlled in accordance with received commands to change the flight state of the aerial vehicle.

Optionally, the changing the flight state of the aerial vehicle comprises at least one of the following: changing the speed of the aerial vehicle, changing the altitude of the aerial vehicle, or changing the attitude of the aerial vehicle.

Optionally, when simultaneously controlling the pitch attitude of the aerial vehicle and the rotation speed of the horizontal propulsion assembly, the pitch angle of the aerial vehicle is negatively correlated with the acceleration of the aerial vehicle.

Optionally, the pitch angle of the aerial vehicle when accelerating is less than the pitch angle of the aerial vehicle when decelerating when the commands to change the altitude of the aerial vehicle are the same and the commands to change the attitude of the aerial vehicle are the same.

Optionally, when controlling according to a received command to change the flight state of the aerial vehicle, if the received command instructs the aerial vehicle to accelerate and change its altitude or to maintain the altitude unchanged, the altitude of the aerial vehicle after the acceleration is completed is lower than the altitude indicated by the command.

Optionally, when controlling according to a received command to change the flight state of the aerial vehicle, if the received command instructs the aerial vehicle to decelerate and change its altitude or to maintain the altitude unchanged, the altitude of the aerial vehicle after the deceleration is completed is higher than the altitude indicated by the command.

Optionally, the fixed wing is disposed substantially in the center of the fuselage.

Optionally, one of the rotors or the plurality of rotors in the multi-rotor assembly has a rotor mounting angle greater than or equal to 5 degrees and less than or equal to 25 degrees.

Optionally, the controlling the pitch attitude of the aerial vehicle comprises: adjusting the rotational speeds of a first rotor and a second rotor disposed on both sides of a fuselage to control the pitch attitude of the aerial vehicle when at least one rotor of the multi-rotor assembly fails; wherein the moment modulus of the composite lift force generated by the first rotor and second rotor acting on the fuselage is less than zero.

Optionally, the control method further comprises:
after the received command changes the flight state of the aerial vehicle, returning the pitch attitude of the aerial vehicle to a state of horizontal cruise.

Some embodiments of the present disclosure provide a method of controlling an aerial vehicle, by controlling a change in the operating state of the horizontal thruster during the cruise of the aerial vehicle to cause resistance to the horizontal propulsion assembly, which allows for a more rapid response to deceleration commands, improved obstacle avoidance performance, and better safety.

The specific principles and realization of the control method of the aerial vehicle provided in the embodiments of the present disclosure are similar to the control method of the aerial vehicle of the preceding embodiments, and will not be repeated herein.

Please refer to FIG. 7 in conjunction with the foregoing embodiment, which is a flow diagram of a control method of an aerial vehicle provided by some embodiments of the present disclosure. The control method for an aerial vehicle may be applied in an aerial vehicle or a control device of the aerial vehicle, such as a flight controller, for controlling processes such as the flight attitude of the aerial vehicle. Further, the aerial vehicle may be an unmanned aerial vehicle or may also be a manned aerial vehicle.

In some implementations, the aerial vehicle may fly autonomously or may fly based on commands sent from the terminal device, such as speed change commands, attitude change commands, or altitude change commands. Exemplarily, the terminal device includes at least one of the following: a cell phone, a tablet, a laptop, a desktop computer, a personal digital assistant, a wearable device, or a remote control.

As shown in FIG. 2, the aerial vehicle 100 includes a fuselage 110, a fixed wing 120, a multi-rotor assembly 130, and a horizontal propulsion assembly 140, with the fixed wing 120 disposed on both sides of the fuselage 110, the multi-rotor assembly 130 mounted to the fuselage 110 or the fixed wing 120, and the horizontal propulsion assembly 140 disposed on the head 101 or tail of the fuselage 110 to provide the aerial vehicle 100 with cruising of horizontal thrust. Exemplarily, a bracket 150 is symmetrically attached to both sides of the fixed wing 120, and the multi-rotor assembly 130 is attached to the bracket 150.

Optionally, the number of fixed wings 120 may be one or more, or the fixed wings 120 may be integrally disposed with the fuselage 110, such as in a wing-body combination configuration.

Optionally, the multi-rotor assembly 130 includes a plurality of rotors, or a plurality of culvert fans, which may be in the form of, for example, a 6-axis or co-axial twin propeller, and the number of blades of the rotors may be two blades, three blades, four blades, without limiting the number of paddle blades.

Optionally, the horizontal propulsion assembly 140 includes one or more thrusters, or includes one or more culvert fans. In some implementations, the horizontal propulsion assembly 140 can be controlled to generate a yaw moment module to adjust the yaw attitude of the aerial vehicle.

As shown in FIG. 7, the method of controlling an aerial vehicle of an embodiment of the present disclosure comprises steps S310 to steps S330:

S310, controlling all rotor of the multi-rotor assembly to rotate so that the multi-rotor assembly and the fixed wing together provide lift to the aerial vehicle during the cruise of the aerial vehicle;

S320, controlling rotational speeds of a plurality of rotors in the multi-rotor assembly to adjust an attitude of the aerial vehicle during the cruise of the aerial vehicle;

S330, during the cruise of the aerial vehicle, simultaneously controlling a pitch attitude of the aerial vehicle, a rotation speed of the horizontal propulsion assembly, and the lift generated by the rotor assembly in accordance with received commands to change the flight state of the aerial vehicle.

Optionally, the changing the flight state of the aerial vehicle comprises at least one of the following: changing the speed of the aerial vehicle, changing the altitude of the aerial vehicle, and changing the attitude of the aerial vehicle.

Optionally, when simultaneously controlling the pitch attitude of the aerial vehicle and the rotation speed of the horizontal propulsion assembly, the pitch angle of the aerial vehicle is negatively correlated with the acceleration of the aerial vehicle.

Optionally, the pitch angle of the aerial vehicle when accelerating is less than the pitch angle of the aerial vehicle when decelerating when the commands to change the altitude of the aerial vehicle are the same and the commands to change the attitude of the aerial vehicle are the same.

Optionally, when controlling according to a received command to change the flight state of the aerial vehicle, if the received command instructs the aerial vehicle to accelerate and change its altitude or to maintain the altitude unchanged, the altitude of the aerial vehicle after the acceleration is completed is lower than the altitude indicated by the command.

Optionally, when controlling according to a received command to change the flight state of the aerial vehicle, if the received command instructs the aerial vehicle to decelerate and change its altitude or to maintain the altitude unchanged, the altitude of the aerial vehicle after the deceleration is completed is higher than the altitude indicated by the command.

Optionally, the controlling the pitch attitude of the aerial vehicle, the rotation speed of the horizontal propulsion assembly, based on received commands to change the flight state of the aerial vehicle, comprising:

determining the first target pitch angle based on the received speed change command and altitude change command;

determining the pitch compensation amount based on the speed change command;

determining a second target pitch angle based on the sum of the first target pitch angle and the pitch compensation amount;

controlling the pitch angle of the aerial vehicle to converge to the second target pitch angle based on the second target pitch angle.

Optionally, the pitch compensation amount is negative when the speed change command directs the aerial vehicle to accelerate, and the pitch compensation amount is positive when the speed change command directs the aerial vehicle to decelerate.

Optionally, the determining the first target pitch angle based on the received speed change command and altitude change command comprises:

based on the correspondence between preset first target pitch angles and the speed change commands and the altitude change commands, determining the first target pitch angle based on the received speed change command and the altitude change command.

Optionally, the determining the first target pitch angle based on the received speed change command and altitude change command comprises:

based on the predetermined optimization model, the first target pitch angle is determined based on the received speed change command and altitude change command.

Optionally, the predetermined state quantities of the optimization model include a speed change command, an altitude change command, a first target pitch angle, a rotor lift, and a horizontal thrust.

Optionally, the objective function of the optimization model comprises at least one of the following: power demand, response time, actuator output variation, or actuator power.

Optionally, the constraint of the optimization model comprises at least one of the following: a flight heading angle constraint, a flight state constraint, and a movement amplitude constraint.

Optionally, the simultaneously controlling the pitch attitude of the aerial vehicle, the rotation speed of the horizontal propulsion assembly, and the lift generated by the rotor assembly, in accordance with received commands to change the flight state of the aerial vehicle, comprising:

adjusting the rotational speed of the rotors in the multi-rotor assembly based on the rotor lift determined by the received speed change command and altitude change command; and/or adjusting the rotation speed of the horizontal propulsion assembly based on the horizontal thrust determined by the received speed change command and height change command.

Optionally, the simultaneously controlling the pitch attitude of the aerial vehicle, the rotation speed of the horizontal propulsion assembly, and the lift generated by the rotor assembly, based on received commands to change the flight state of the aerial vehicle, further comprising:

determining the rotor lift and the horizontal thrust based on a preset correspondence of the rotor lifts and the horizontal thrusts with the speed change commands and the altitude change commands, and based on the received speed change command and the altitude change command.

Optionally, the simultaneously controlling the pitch attitude of the aerial vehicle, the rotation speed of the horizontal propulsion assembly, and the lift generated by the rotor assembly, based on received commands to change the flight state of the aerial vehicle, further comprising:

based on a predetermined optimization model, determining the rotor lift and the horizontal thrust based on the received speed change command and altitude change command.

Optionally, the fixed wing is disposed substantially in the center of the fuselage.

Optionally, one of the rotors or the plurality of rotors in the multi-rotor assembly has a rotor mounting angle greater than or equal to 5 degrees and less than or equal to 25 degrees.

Optionally, the controlling the pitch attitude of the aerial vehicle comprises: adjusting the rotational speeds of a first rotor and a second rotor disposed on both sides of a fuselage to control the pitch attitude of the aerial vehicle when at least one rotor of the multi-rotor assembly fails; wherein the moment modulus of the composite lift force generated by the first rotor and second rotor acting on the fuselage is less than zero.

Optionally, the control method further comprises:

after the received command changes the flight state of the aerial vehicle, returning the pitch attitude of the aerial vehicle to a state of horizontal cruise.

Some embodiments of the present disclosure provide a method of controlling an aerial vehicle, wherein the pitch attitude of the aerial vehicle, the rotation speed of the horizontal propulsion assembly, and the lift generated by the rotor assembly are simultaneously controlled in accordance with received commands to change the flight state of the aerial vehicle during cruise of the aerial vehicle, wherein controlling the pitch attitude of the aerial vehicle can enable the aerial vehicle to respond faster to a speed change command and/or an altitude change command, thereby improving maneuverability of the aerial vehicle.

The specific principles and realization of the control method of the aerial vehicle provided in the embodiments of the present disclosure are similar to the control method of the aerial vehicle of the preceding embodiments, and will not be repeated herein.

Referring to FIG. 8 in conjunction with the above embodiments, FIG. 8 is a schematic block diagram of a control device 600 for an aerial vehicle provided by some embodiments of the present disclosure.

In some implementations, the aerial vehicle may fly autonomously or may fly based on commands sent from the terminal device, such as speed change commands, attitude change commands, altitude change commands. Exemplarily, the terminal device includes at least one of the following: a cell phone, a tablet, a laptop, a desktop computer, a personal digital assistant, a wearable device, or a remote control.

As shown in FIG. 2, the aerial vehicle 100 includes a fuselage 110, a fixed wing 120, a multi-rotor assembly 130, and a horizontal propulsion assembly 140, with the fixed wing 120 disposed on both sides of the fuselage 110, the multi-rotor assembly 130 mounted to the fuselage 110 or the fixed wing 120, and the horizontal propulsion assembly 140 disposed on the head 101 or tail of the fuselage 110 to provide the aerial vehicle 100 with cruising of horizontal thrust. Exemplarily, a bracket 150 is symmetrically attached to both sides of the fixed wing 120, and the multi-rotor assembly 130 is attached to the bracket 150.

Optionally, the number of fixed wings 120 may be one or more, or the fixed wings 120 may be integrally disposed with the fuselage 110, such as in a wing-body combination configuration.

Optionally, the multi-rotor assembly 130 includes a plurality of rotors, or a plurality of culvert fans, which may be in the form of, for example, a 6-axis or co-axial twin propeller, and the number of blades of the rotors may be two blades, three blades, four blades, without limiting the number of rotor blades.

Optionally, the horizontal propulsion assembly 140 includes one or more thrusters, or includes one or more culvert fans. In some implementations, the horizontal propulsion assembly 140 can be controlled to generate a yaw moment module to adjust the yaw attitude of the aerial vehicle.

The control device 600 includes one or more processors 601, the one or more processors 601 operating individually or together for performing the control method of the aerial vehicle as previously described.

Exemplarily, the control device 600 further includes a memory 602.

Exemplarily, the processor 601 and the memory 602 are connected via a bus 603, which is, for example, an I2C (Inter-integrated Circuit) bus.

Optionally, the processor 601 may be a Micro-controller Unit (MCU), a Central Processing Unit (CPU), or a Digital Signal Processor (DSP), among others.

Optionally, the memory 602 may be a Flash chip, a read-only memory (ROM, Read-Only Memory) disk, a CD-ROM, a USB flash drive, or a removable hard drive.

Optionally, the processor 601 is used to run a computer program stored in memory 602 and to implement the foregoing method of controlling an aerial vehicle in the execution of the computer program.

Exemplarily, the processor 601 is used to run a computer program stored in memory 602 and to implement the following steps in executing the computer program:

during the cruise of the aerial vehicle, all rotors of the multi-rotor assembly are controlled to rotate so that the multi-rotor assembly and the fixed wing together provide lift to the aerial vehicle;

controlling the rotational speed of a plurality of rotors in the multi-rotor assembly to adjust the attitude of the aerial vehicle during the cruise of the aerial vehicle; and adjusting the rotational speed of at least one of the normal rotors to control the attitude of the aerial vehicle when at least one of the multi-rotor assemblies fails during the cruise of the aerial vehicle; wherein the moment modulus of the composite lift force generated by all the normal rotors acting on the fuselage is greater than zero.

Exemplarily, the processor 601 is used to run a computer program stored in memory 602 and to implement the following steps in executing the computer program:

during the cruise of the aerial vehicle, all rotors of the multi-rotor assembly are controlled to rotate so that the multi-rotor assembly and the fixed wing together provide lift to the aerial vehicle;

controlling the rotational speed of a plurality of rotors in the multi-rotor assembly to adjust the attitude of the aerial vehicle during the cruise of the aerial vehicle; and during the cruise of the aerial vehicle, when a deceleration command is received, a change in the operating state of the horizontal thruster is controlled to create drag on the horizontal propulsion assembly.

Exemplarily, the processor 601 is used to run a computer program stored in memory 602 and to implement the following steps in executing the computer program:

during the cruise of the aerial vehicle, all rotors of the multi-rotor assembly are controlled to rotate so that the multi-rotor assembly and the fixed wing together provide lift to the aerial vehicle;

controlling the rotational speed of a plurality of rotors in the multi-rotor assembly to adjust the attitude of the aerial vehicle during the cruise of the aerial vehicle; and during the cruise of the aerial vehicle, the pitch attitude of the aerial vehicle, the rate of rotation of the horizontal propulsion assembly, and the lift generated by the rotor assembly are simultaneously controlled in accordance with received commands to change the flight state of the aerial vehicle.

The specific principles and realization of the control device of the aerial vehicle provided in the embodiments of the present disclosure are similar to the control method of the aerial vehicle of the preceding embodiments, and will not be repeated herein.

Some embodiments of the present disclosure also provide a computer-readable storage medium, the computer-readable storage medium storing a computer program, the computer program being executed by a processor causing the processor to implement the steps of the method of controlling an aerial vehicle provided by the embodiments.

The computer-readable storage medium may be an internal storage unit of the control device as described in any of the preceding embodiments, such as a hard disk or memory of the control device. The computer-readable storage medium may also be an external storage device of the control device, such as a plug-in hard disk, a Smart Media Card (SMC), a Secure Digital (SD) card, a Flash Card, etc., provided on the control device.

Figure 9:
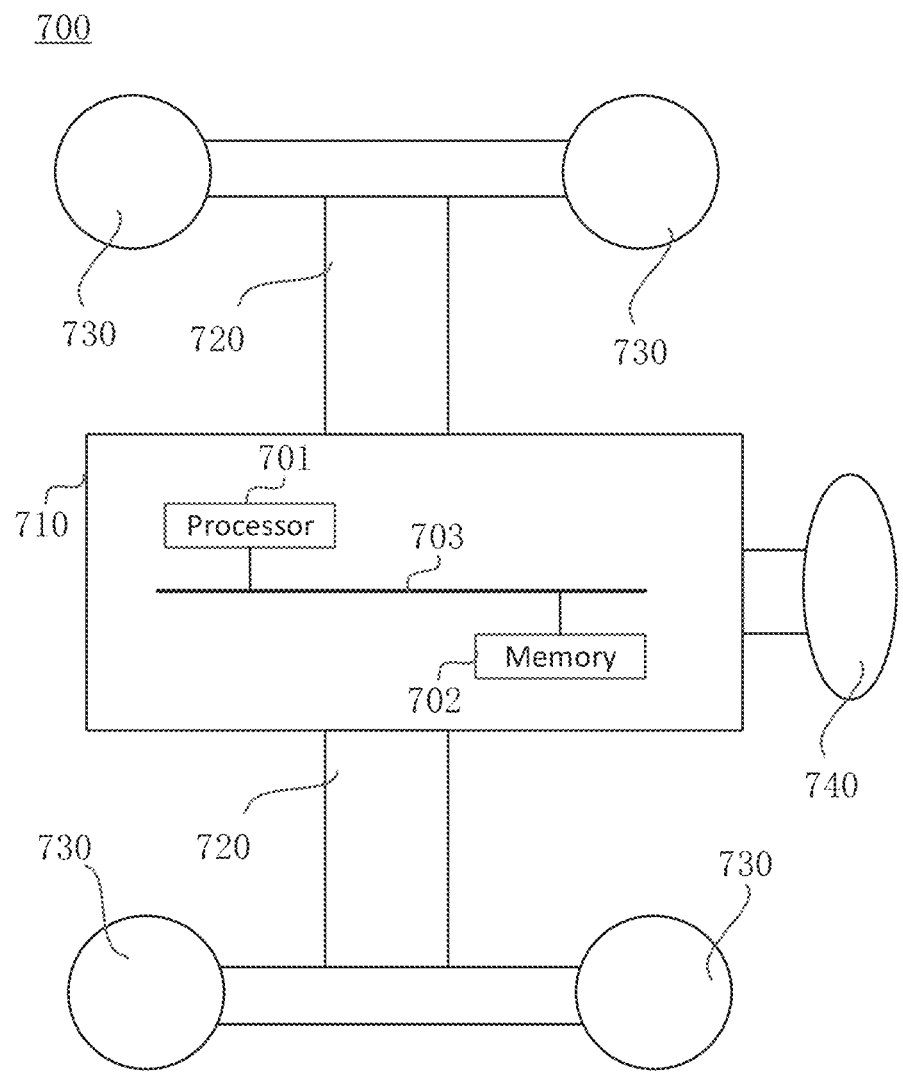
FIG. 9 is a schematic block diagram of an aerial vehicle provided by an embodiment of the present disclosure.

Referring to FIG. 9 in conjunction with the foregoing embodiments, FIG. 9 is a schematic block diagram of an aerial vehicle 700 provided by some embodiments of the present disclosure.

As shown in FIG. 9, the aerial vehicle 700 includes a fuselage 710, a fixed wing 720, a multi-rotor assembly 730, and a horizontal propulsion assembly 740, with the fixed wing 720 disposed on both sides of the fuselage 710, the multi-rotor assembly 730 mounted to the fuselage 710 or fixed wing 720, and the horizontal propulsion assembly 740 disposed at the head or tail end of the fuselage 710 to provide the aerial vehicle 700 with a cruising horizontal thrust. Exemplarily, the fixed wing 720 has brackets symmetrically attached to both sides of the fixed wing 720, and the multi-rotor assembly 730 is attached to the brackets.

Optionally, the number of fixed wings 720 may be one or more, or the fixed wings 720 may be integrally disposed with the fuselage 710, such as in a wing-body combination configuration.

Optionally, the multi-rotor assembly 730 includes a plurality of rotors, or a plurality of culvert fans, which may be in the form of, for example, a 6-axis or co-axial twin propeller, and the number of blades of the rotor may be two blades, three blades, four blades, without limiting the number of paddle blades.

Optionally, the horizontal propulsion assembly 740 includes one or more propellers, or includes one or more culvert fans. In some implementations, the horizontal propulsion assembly 740 can be controlled to generate a yaw moment module length to adjust the yaw attitude of the aerial vehicle.

The aerial vehicle 700 includes one or more processors 701, the one or more processors 701 operating individually or together for performing the control methods of the aerial vehicle as previously described.

Exemplarily, the aerial vehicle 700 further includes a memory 702.

Exemplarily, the processor 701 and the memory 702 are connected via a bus 703, which is, for example, an I2C (Inter-integrated Circuit) bus.

Optionally, the processor 701 may be a Micro-controller Unit (MCU), a Central Processing Unit (CPU), or a Digital Signal Processor (DSP), among others.

Optionally, the memory 702 may be a Flash chip, a read-only memory (ROM, Read-Only Memory) disk, a CD-ROM, a USB flash drive, or a removable hard drive.

The processor 701 is used to run a computer program stored in memory 702 and to implement the foregoing method of controlling an aerial vehicle in the execution of the computer program.

Exemplarily, the processor 701 is used to run a computer program stored in memory 702 and to implement the following steps in executing the computer program:

during the cruise of the aerial vehicle, all rotors of the multi-rotor assembly are controlled to rotate so that the multi-rotor assembly and the fixed wing together provide lift to the aerial vehicle;

controlling the rotational speed of a plurality of rotors in the multi-rotor assembly to adjust the attitude of the aerial vehicle during the cruise of the aerial vehicle; and adjusting the rotational speed of at least one of the normal the rotors to control the attitude of the aerial vehicle when at least one of the multi-rotor assemblies fails during the cruise of the aerial vehicle; wherein the moment modulus of the composite lift force generated by all the normal rotors acting on the fuselage is greater than zero.

Exemplarily, the processor 701 is used to run a computer program stored in memory 702 and to implement the following steps in executing the computer program:

during the cruise of the aerial vehicle, all rotors of the multi-rotor assembly are controlled to rotate so that the multi-rotor assembly and the fixed wing together provide lift to the aerial vehicle;

controlling the rotational speed of a plurality of rotors in the multi-rotor assembly to adjust the attitude of the aerial vehicle during the cruise of the aerial vehicle; and during the cruise of the aerial vehicle, when a deceleration command is received, a change in the operating state of the horizontal thruster is controlled to create drag on the horizontal propulsion assembly.

Exemplarily, the processor 701 is used to run a computer program stored in memory 702 and to implement the following steps in executing the computer program:

during the cruise of the aerial vehicle, all rotors of the multi-rotor assembly are controlled to rotate so that the multi-rotor assembly and the fixed wing together provide lift to the aerial vehicle;

controlling the rotational speed of a plurality of rotors in the multi-rotor assembly to adjust the attitude of the aerial vehicle during the cruise of the aerial vehicle; and during the cruise of the aerial vehicle, the pitch attitude of the aerial vehicle, the rate of rotation of the horizontal propulsion assembly, and the lift generated by the rotor assembly are simultaneously controlled in accordance with received commands to change the flight state of the aerial vehicle.

The specific principles and realization of the aerial vehicle provided in the embodiments of the present disclosure are similar to the control methods of the aerial vehicle of the preceding embodiments, and will not be repeated herein.

Some embodiments of the present disclosure also provide a computer-readable storage medium, the computer-readable storage medium storing a computer program, the computer program comprising program commands, the computer program being executed by a processor causing the processor to implement the steps of the method of controlling an aerial vehicle provided by the embodiments.

Wherein the computer-readable storage medium may be an internal storage unit of the aerial vehicle as described in any of the preceding embodiments, such as a hard disk or memory of the aerial vehicle. The computer-readable storage medium may also be an external storage device of the aerial vehicle, such as a plug-in hard disk, a Smart Media Card (SMC), a Secure Digital (SD) card, a Flash Card, etc., equipped on the aerial vehicle.

It should be understood that the terminology used herein in this disclosure is used solely for the purpose of describing particular embodiments and is not intended to limit this disclosure.

It should also be understood that the term "and/or" as used in this disclosure and the appended claims refers to and includes any combination and all possible combinations of one or more of the items listed in association.

The foregoing is only a specific embodiment of the present disclosure, but the scope of protection of the present disclosure is not limited thereto, and any person skilled in the art can easily think of various equivalent modifications or substitutions within the scope of the technology disclosed in the present disclosure, which shall be covered by the scope of protection of the present disclosure. Therefore, the scope of protection of this disclosure shall be subject to the scope of protection of the claims.

What is claimed is:

1. A controller for an aerial vehicle, the aerial vehicle comprising a fuselage, fixed wings, and a multi-rotor assembly, the fixed wings disposed on both sides of the fuselage, and the multi-rotor assembly comprising at least two rotors disposed on either the fuselage or the fixed wings;
the controller comprising:
at least one memory storing at least one instruction set configured to control the aerial vehicle, and
at least one processor, communicatively coupled to the at least one memory,
wherein, when the aerial vehicle operates, the at least one processor executes the at least one instruction set to:
during cruise of the aerial vehicle, control at least a portion of the at least two rotors of the multi-rotor assembly to actively rotate to provide a force in a vertical direction so that the multi-rotor assembly and the fixed wings together provide lift for the aerial vehicle; and
during the cruise of the aerial vehicle, in response to a failure of at least one rotor of the multi-rotor assembly, control at least one of normal rotors among the at least two rotors to change rotational speed to control an attitude of the aerial vehicle;
wherein a moment modulus of a composite lift force generated by all the normal rotors acting on the fuselage is greater than zero.

2. The controller according to claim 1, wherein the aerial vehicle further comprises a propulsion assembly, the propulsion assembly being disposed on the fuselage, the propulsion assembly being configured to provide thrust for the cruise of the aerial vehicle, the at least one processor further executing the at least one instruction set to:
in response to receiving a deceleration command during the cruise of the aerial vehicle, control the propulsion assembly to change its operating state so that the propulsion assembly generates drag.

3. The controller according to claim 2, wherein the controlling the propulsion assembly to change its operating state so that the propulsion assembly generates drag comprises:
controlling the propulsion assembly to reverse rotation to cause the propulsion assembly to generate the drag.

4. The controller according to claim 2, wherein the at least one processor further executes the at least one instruction set to:
in response to completion of deceleration of the aerial vehicle, control the propulsion assembly to change its operating state to provide the thrust for the aerial vehicle.

5. The controller according to claim 1, wherein the moment modulus of the composite lift force generated by all the normal rotors acting on the fuselage is greater than zero comprises at least one of the following:
a moment modulus of the composite lift force generated by all the normal rotors relative to a pitch axis of the fuselage is greater than zero;
a moment modulus of the composite lift force generated by all the normal rotors relative to a heading axis of the fuselage is greater than aero; and
a moment modulus of the composite lift force generated by all the normal rotors relative to a traverse roll axis of the fuselage is greater than aero.

6. The controller according to claim 1, wherein the fixed wings are provided at a middle portion of the fuselage.

7. The controller according to claim 1, wherein a rotor mounting angle of at least one of the at least two rotors in the multi-rotor assembly is greater than or equal to 5 degrees and less than or equal to 25 degrees.

8. The controller according to claim 1, wherein the multi-rotor assembly comprises a first rotor and a second rotor disposed on both sides of the fuselage respectively, a center of gravity of the aerial vehicle being located between a point of action of a lift of the fixed wings and a point of action of the composite lift of the first rotor and the second rotor.

9. The controller according to claim 1, wherein the aerial vehicle further comprises a propulsion assembly, the propulsion assembly configured to provide the aerial vehicle with thrust for cruising, the at least one processor further executing the at least one instruction set to:
during the cruise of the aerial vehicle, in response to receiving a command to change a flight state of the aerial vehicle, control a pitch attitude of the aerial vehicle and/or a rotation speed of the propulsion assembly and/or a lift generated by the multi-rotor assembly.

10. The controller according to claim 9, wherein the command to change the flight state of the aerial vehicle comprises at least one of the following: a command to change a speed of the aerial vehicle, a command to change an altitude of the aerial vehicle, or a command to change the attitude of the aerial vehicle.

11. A control method of an aerial vehicle, the aerial vehicle comprising a fuselage, fixed wings and a multi-rotor assembly, the fixed wings being disposed on both sides of the fuselage and the multi-rotor assembly being disposed on either the fuselage or the fixed wings; and the method comprising:
during cruise of the aerial vehicle, controlling at least a portion of the at least two rotors of the multi-rotor assembly to actively rotate to provide a force in a vertical direction so that the multi-rotor assembly and the fixed wings together provide lift for the aerial vehicle; and
during the cruise of the aerial vehicle, in response to a failure of at least one rotor of the multi-rotor assembly, controlling at least one of normal rotors among the at least two rotors to change rotational speed to control an attitude of the aerial vehicle;
wherein a moment modulus of a composite lift force generated by all the normal rotors acting on the fuselage is greater than zero.

12. The control method according to claim 11,
wherein the aerial vehicle further comprises a propulsion assembly,
the method further comprising:
during the cruise of the aerial vehicle, in response to receiving a deceleration command, controlling the propulsion assembly to change its operating state so that the propulsion assembly generates drag.

13. The control method according to claim 12, wherein the controlling the propulsion assembly to change its operating state so that the propulsion assembly generates drag comprises:
controlling the propulsion assembly to rotate in a reverse direction so as to generate the drag; or
stopping power to the propulsion assembly so as to cause horizontal propellers to rotate under an action of airflow.

14. The control method according to claim 11,
wherein the aerial vehicle further comprises a propulsion assembly,
the method further comprising:
during the cruise of the aerial vehicle, in response to receiving a speed change command, simultaneously controlling a pitch attitude of the aerial vehicle and a rotation speed of the propulsion assembly to accelerate or decelerate, and, upon completion of the acceleration or the deceleration, returning the pitch attitude of the aerial vehicle to a horizontal cruise state; or
during the cruising of the aerial vehicle, in response to receiving the speed change command and an altitude change command, simultaneously controlling the pitch attitude of the aerial vehicle and the rotation speed of the propulsion assembly to accelerate or decelerate, and, upon completion of the acceleration or deceleration, causing the pitch attitude of the aerial vehicle to change in response to the altitude change command, and, upon completion of the altitude change, returning the pitch attitude of the aerial vehicle to the horizontal cruise state.

15. The control method according to claim 11,
wherein the aerial vehicle further comprises a propulsion assembly,
the method further comprising:
during the cruise of the aerial vehicle, in response to receiving a command of changing a flight state of the aerial vehicle, simultaneously controlling a pitch attitude of the aerial vehicle, a rotation speed of the propulsion assembly, and a lift generated by the rotor assembly.

16. The control method according to claim 15, wherein, when controlling in response to the received command of changing the flight state of the aerial vehicle, in response to the received command instructing the aerial vehicle to accelerate and change an altitude of the aerial vehicle or to maintain the altitude unchanged, the altitude of the aerial vehicle after the acceleration has been completed is lower than the altitude indicated by the received command; or
when controlling in response to the received command of changing the flight state of the aerial vehicle, in response to the received command instructing the aerial vehicle to decelerate and change the altitude or to maintain the altitude unchanged, the altitude of the aerial vehicle after the deceleration is completed is higher than the altitude indicated by the received command.

17. An aerial vehicle comprising:
a fuselage;
fixed wings, the fixed wings being located on both sides of the fuselage;
a multi-rotor assembly comprising at least two rotors, the at least two rotors being disposed on the fuselage or the fixed wings;
at least one memory storing at least one instruction set configured to control the aerial vehicle; and
at least one processor, communicatively coupled to the at least one memory,
wherein, when the aerial vehicle operates, the at least one processor executes the at least one instruction set to:
during cruise of the aerial vehicle, control at least a portion of the at least two rotors of the multi-rotor assembly to actively rotate to provide a force in a vertical direction so that the multi-rotor assembly and the fixed wings together provide lift for the aerial vehicle; and
during the cruise of the aerial vehicle, in response to a failure of at least one rotor of the multi-rotor assembly, control at least one of normal rotors among the at least two rotors to change rotational speed to control an attitude of the aerial vehicle;
wherein a moment modulus of a composite lift force generated by all the normal rotors acting on the fuselage is greater than zero.

* * * * *